United States Patent [19]

Ayers et al.

[11] 4,399,040
[45] Aug. 16, 1983

[54] OPEN SEA SKIMMER BARGE

[75] Inventors: William M. Ayers, Duncan, Okla.; Ashok K. Maheshwary; Peter J. Young, both of Houston, Tex.

[73] Assignee: Halliburton Company, Duncan, Okla.

[21] Appl. No.: 304,511

[22] Filed: Sep. 21, 1981

Related U.S. Application Data

[62] Division of Ser. No. 161,088, Jun. 19, 1980, abandoned.

[51] Int. Cl.³ .............................................. E02B 15/04
[52] U.S. Cl. ..................................... 210/749; 210/804; 210/242.3; 210/923
[58] Field of Search .......... 210/242.3, 242.4, 923–925, 210/663, 671, 691, 693, 749, 801, 800, 804, 806; 405/66, 72

[56] References Cited

U.S. PATENT DOCUMENTS

| | | | |
|---|---|---|---|
| 48,841 | 7/1865 | Scoville | 210/154 |
| 54,014 | 4/1866 | Ralston | 415/7 |
| 95,089 | 9/1869 | Cowley | 210/154 |
| 2,500,354 | 2/1945 | Harris | 114/45 |
| 3,142,281 | 7/1962 | Muller | 210/923 X |
| 3,314,540 | 7/1963 | Lane | 210/924 X |
| 3,314,545 | 4/1967 | Grabbe et al. | 210/242.4 |
| 3,561,601 | 2/1971 | McNeely | 210/925 X |
| 3,615,017 | 12/1969 | Valdespino | 210/242.3 |
| 3,690,464 | 9/1972 | Heinscke | 210/242.3 |
| 3,708,070 | 1/1973 | Bell | 210/242.3 |
| 3,715,034 | 2/1973 | Ivanoff | 210/242.3 |
| 3,744,257 | 7/1973 | Spanner | 210/923 X |
| 3,815,751 | 6/1974 | Pavlovic | 210/242.3 |
| 3,823,828 | 7/1974 | Derzhavets et al. | 210/242.3 |
| 3,860,519 | 1/1975 | Weatherford | 210/242.3 |
| 3,875,062 | 4/1975 | Rafael | 210/242.3 |
| 3,966,615 | 6/1976 | Petchul et al. | 210/242.3 |
| 4,033,876 | 7/1977 | Cocjin et al. | 210/923 X |
| 4,058,461 | 11/1977 | Gaw | 210/923 X |
| 4,061,569 | 12/1977 | Bennett et al. | 210/923 X |
| 4,120,793 | 10/1978 | Strain | 210/242.1 |
| 4,379,054 | 4/1983 | Ayers | 210/242.3 |

*Primary Examiner*—Thomas G. Wyse
*Attorney, Agent, or Firm*—James R. Duzan; Thomas R. Weaver

[57] ABSTRACT

An open sea skimmer barge comprising a hull having a bow, bottom, side walls, stern having a substantially horizontal elongate slot extending across a portion thereof and a deck, a spill suction tunnel, a collection tank, secondary oil separation means and tertiary oil separation means.

26 Claims, 29 Drawing Figures

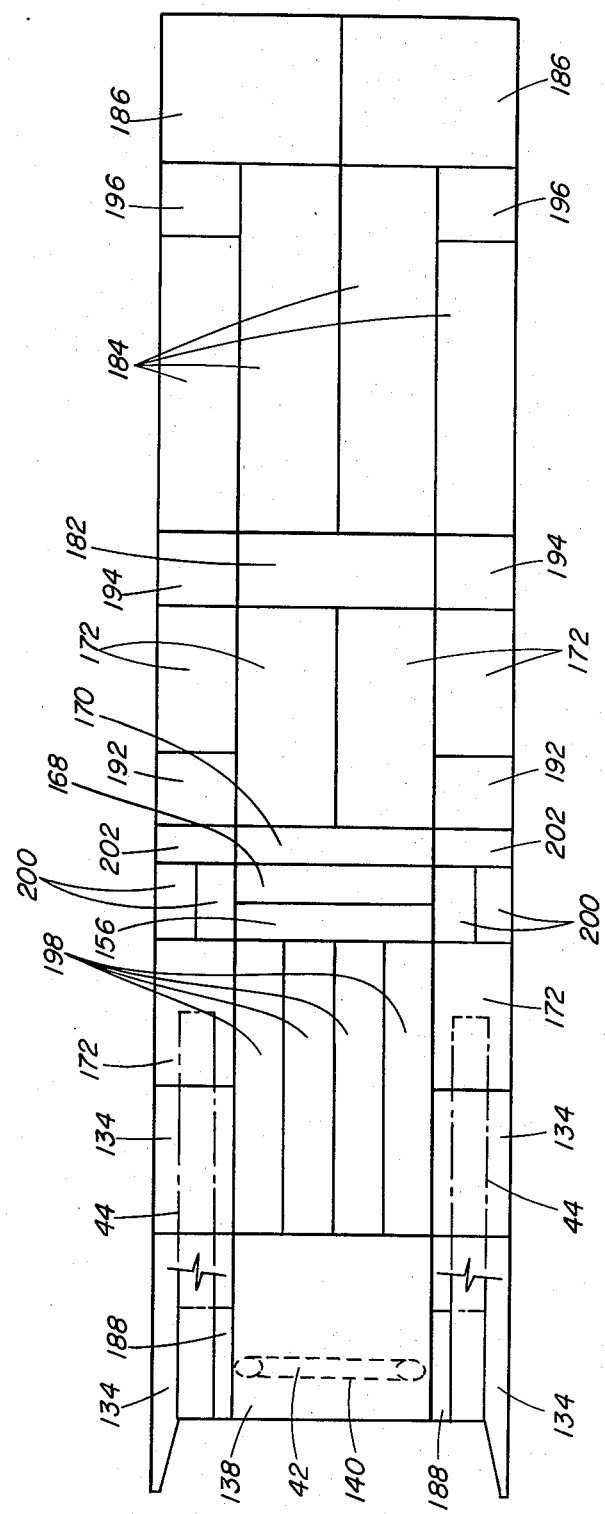

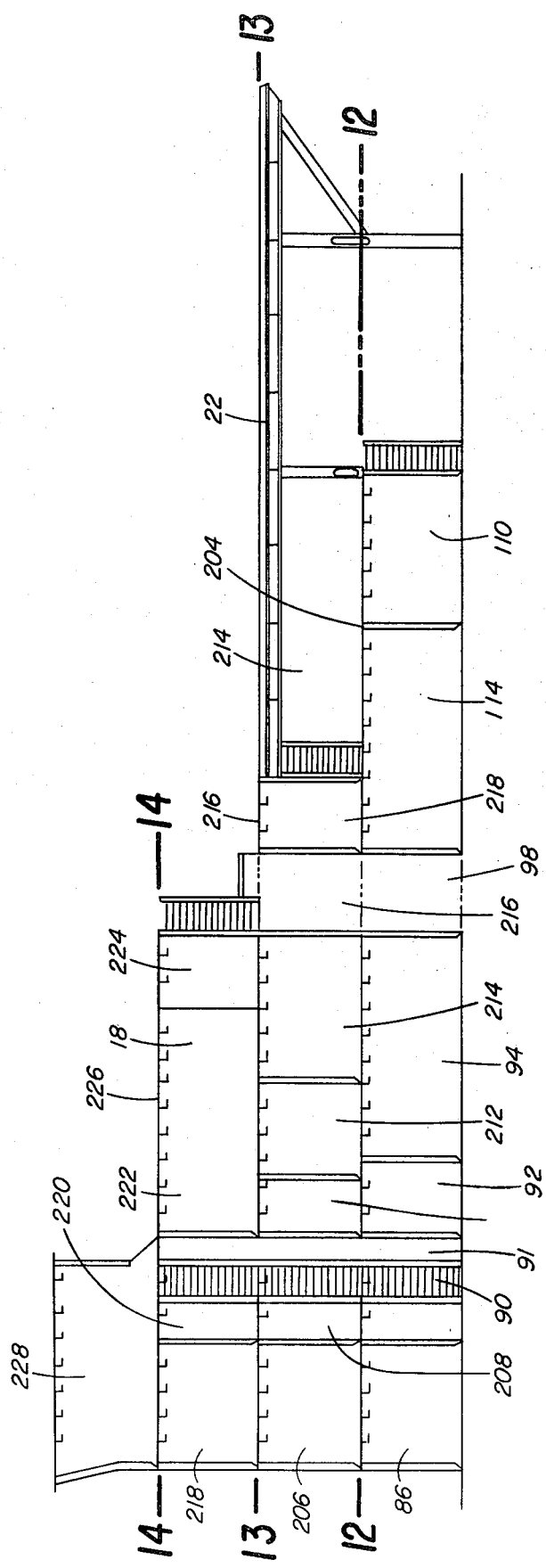

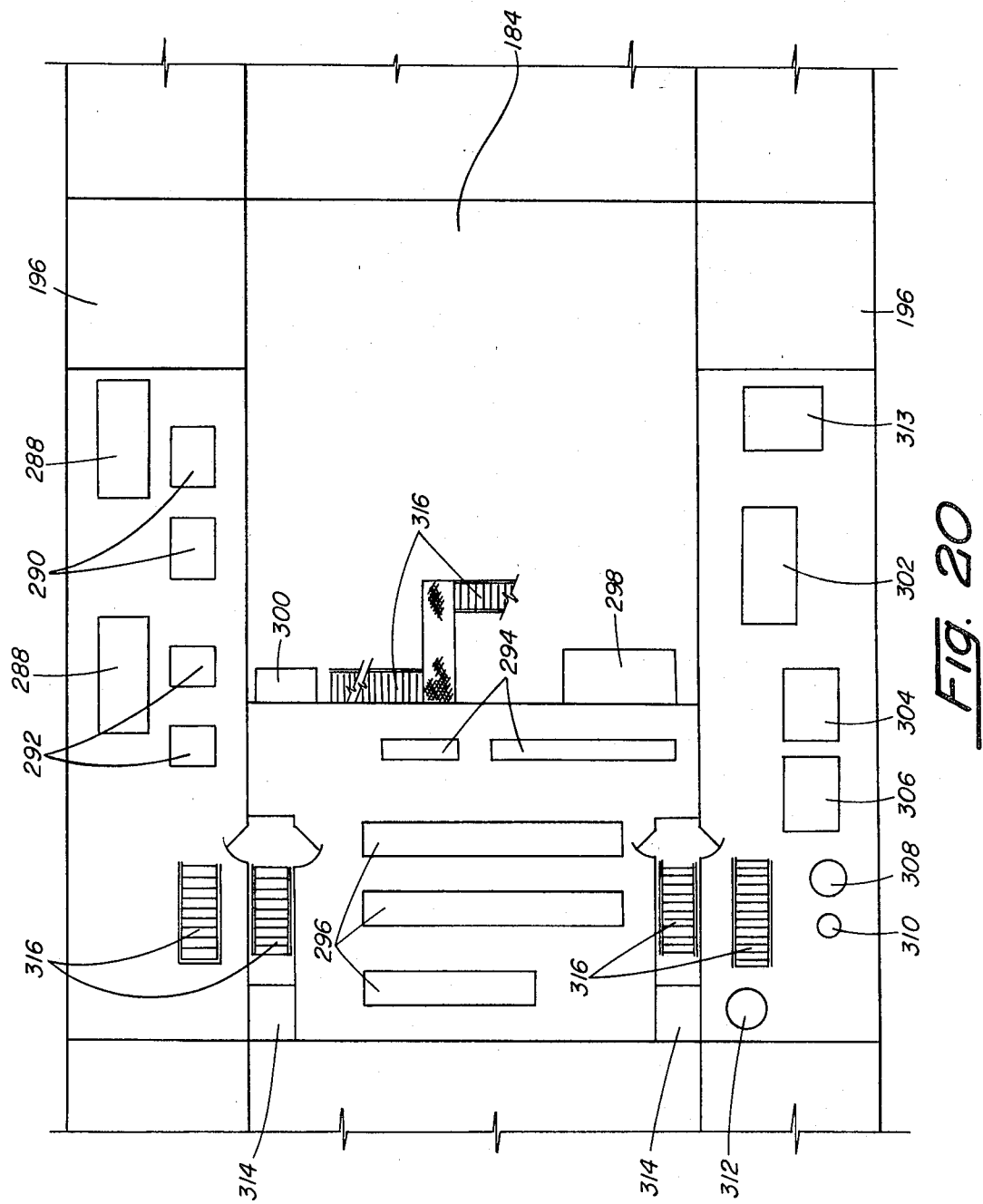

OPEN SEA SKIMMER BARGE

This is a division of application Ser. No. 161,088, filed June 19, 1980, now abandoned.

BACKGROUND OF THE INVENTION

This invention is directed to an open sea skimming barge for the removal of crude oil, refined hydrocarbon product or other floating pollutant slicks from water surfaces, particularly those slicks caused by accidents while handling, transporting, processing, controlling, producing or exploring for hydrocarbons.

For many years, crude oil and refined hydrocarbon product spillages at sea have been a problem. The environmental damage and cleanup costs of large spills can reach millions of dollars, which along with damaging publicity present a serious problem for the industries involved. As more crude oil and refined hydrocarbon products are being transported over longer distances by larger tankers, and with the increases in offshore hydrocarbon exploration and production, the problem of dealing with spillages is likely to increase.

Since crude oil and refined hydrocarbon product spillages are likely to continue at an ever increasing rate, a method and apparatus are needed for reliably removing the spillages as rapidly as possible from the surface of the water in open seas, or large bays, lakes and rivers.

Slicks in the open sea vary considerably in their characteristics depending upon the type of crude oil or refined hydrocarbon product spilled, the weather, size of the spillage and the condition of the sea. The slick thickness may vary on the surface of the sea and be considered as having a portion extending below the surface of the sea due to the continual degradation of the slick by the elements and natural evaporation of the hydrocarbons.

When compared with the problems of recovering spillages in quiet, calm seas, bays, harbors or rivers, the recovery of spillages in the open sea, particularly under adverse weather conditions, is clearly more difficult. Open sea spillage recovery requires equipment which must be self-contained, capable of maintaining its station over long periods of time, and capable of operating in adverse weather conditions, such as in seas of eight feet or more. Frequently in the past, many types of spillage recovery equipment have only been effective in relatively calm conditions and were intended for short term operation.

To date, many types of methods and apparatus have been used in attempts to deal with spillages.

Detergents and other chemical treatments of slicks have been, and continue to be utilized, but each has limitations and inherent hazards which can be as undesirable as the slicks themselves.

Early attempts were usually directed to dealing with spillages of oil in flowing streams. Typical apparatus comprised collection reservoirs or rotating drum type pumps, such as shown in U.S. Pat. Nos. 48,411; 54,014 and 95,089.

Prior spillage removal equipment employing endless belt transports, such as those described in U.S. Pat. Nos. 3,314,540 and 3,314,545, are considered by their design to have a limited capacity to collect floatage of both solid and liquid forms of the spillage. More particularly, some prior constructions depend on the adherence of floatage to the belt transport to recover solid and liquid floating material of the spillage. Others provide structures that push the spillage to recover the same, and still others require pumps to enhance the collection of floatage, such as the belt transport sold by Marco Pollution Control, Seattle, Wash. Yet others tend at least to partially bulldoze the spillage being recovered, which increases the likelihood that some spillage will be pushed to the side and hence not collected.

Another prior skimming type spillage recovery equipment utilizes a submerged forward lip or ledge and processes all the inflow, whether floatage to be removed or the liquid spillage being skimmed, which is above the shelf edge. This type of recovery equipment generally takes in the floatage and liquid spillage which is above the shelf edge, and hence leaves floatage and liquid spillage uncollected where there is a considerable depth thereof. This type of arrangement is illustrated in U.S. Pat. Nos. 3,690,464; 3,875,062 and 3,823,828. This skimming equipment illustrated utilizes the forward velocity of the vessel and the pumping or suction action of either the vessel's propulsion means or a separate pumping means to help enhance the flow of spillage over the submerged forward lip. Wave action will affect this type of skimming equipment since heavy seas will cause the excessive inflow of water with the spillage since the control of the depth of the forward lip below the surface of the water is difficult. With the excessive inflow of water with the spillage, it will also become more difficult to subsequently separate the spillage therefrom, thereby requiring other types of separation equipment or much larger on-board holding tanks for the excessive water and spillage.

Yet another prior skimming type spillage recovery equipment utilizes a downwardly inclined member having a horizontal slot or opening at the lower end thereof to force the slick downwardly during the passage of the inclined member thereover and into the slot or opening due to the pressure differential created by the buoyancy of the slick. The pressure differential may be increased to ensure the slick will flow into the slot or opening through the use of pumps to decrease the pressure within the cavity fed by the slot or opening. Typical examples of this type of equipment are described in U.S. Pat. Nos. 3,465,882; 3,615,017; 3,715,034; 3,860,519 and 3,966,615 and published U.K. patent application No. GB 2,005,554. In this type of skimming equipment the skimmer may be stationary having a flowing body of water moving thereby, as in U.S. Pat. No. 3,465,882, may be self-propelled through the water utilizing a reduced collection tank pressure, as in U.S. Pat. No. 3,615,017, may be self-propelled utilizing a variable flap to control the slot or opening width and merely utilize a gravity settling technique in the collection tank, as in U.S. Pat. No. 3,715,034, or may be self-propelled utilizing a reduced collection tank pressure and a wave-receiving splash plate on the bow thereof, as in published U.K. patent application No. GB 2,005,554. This type of spillage recovery equipment requires relatively high velocities downwardly along the inclined member of the spillage relative to the inclined member, i.e., for example, five to ten knots, for most efficient operation and also has a tendency to sidewardly deflect a portion of the spillage, even with the addition of vertical extensions along the inclined member to prevent the same. As with the submerged forward lip type skimming equipment, this type of equipment suffers performance degradation in heavy seas since it is difficult to control the height of the inclined member with respect to the wave height. Also, since in open sea skimming operations high forward velocities are required to maintain the high velocities of the spillage downwardly along the inclined member with respect to the inclined member, sideward deflection of the slick, splashing of the slick over the bow of the vessel, and large bow waves created by pushing and churning of the spillage, even in calm seas let along heavy seas, are problems.

Still another type of spillage recovery equipment utilizes a rotating downwardly inclined endless belt to force the slick downwardly during the passage of the belt thereover and into a collection tank due to the pressure differential created by the buoyancy of the slick as it is depressed. Such equipment is illustrated in U.S. Pat. Nos. 3,314,540; 3,804,251; and 3,812,968. While not necessarily requiring high forward velocities for skimming operations, such velocities can be artificially created by increasing the rotational speed of the belts. For open sea skimming operations this type of equipment may require the use of many rotating endless belt assemblies, may have problems operating in heavy seas due to the inability to compensate for wave height variation thereby having waves break over the vessel on which the equipment is installed, and may sidewardly deflect portions of the slick during operations thereby lowering the effective skimming efficiency of the device.

Other types of recovery equipment utilize a combination of slick separation techniques in order to remove as much water from the spillage in order to reduce handling and storage problems on board the equipment. One such device having an initial submerged forward lip to skim the slick, a plurality of rotating drums to further separate the water from the slick and a gravity settling processing tank to further separate the water from the slick is illustrated in U.S. Pat. No. 3,700,107. Another such device having an initial suction type skimming device, a further gravity settling tank for a secondary water and slick separation means and finally a centrifugal type separating means is illustrated in U.S. Pat. No. 3,957,646.

SUMMARY OF THE INVENTION

The open sea skimming barge of the present invention is self-contained, capable of maintaining its station over extended periods of time, capable of operating in adverse weather conditions and utilizes a multiplicity of separation techniques to ensure the most efficient recovery of open sea spillages. The open sea skimming barge of the present invention utilizes a unique spillage suction tunnel having an integral variable flap therein for initial separation of spillage into a collection tank, a secondary recovery means for further separation of the spillage in the collection tank and a tertiary recovery means for the final separation of the spillage for subsequent storage in holding tanks for offloading. The open sea skimming barge of the present invention also utilizes spillage containment booms and storage means therefor.

The present invention and the advantages thereof will be better understood when taken in conjunction with the following specification and drawings.

BRIEF DESCRIPTION OF THE DRAWINGS

FIG. 10 is a plan view of the tank top level of the open sea skimmer barge of the present invention.

FIG. 11 is a cross-sectional view along the centerline of the open sea skimmer barge of the present invention showing the quarters above the main deck.

FIG. 20 is a plan view between decks of the machinery room.

DESCRIPTION OF THE INVENTION

Figure 1:
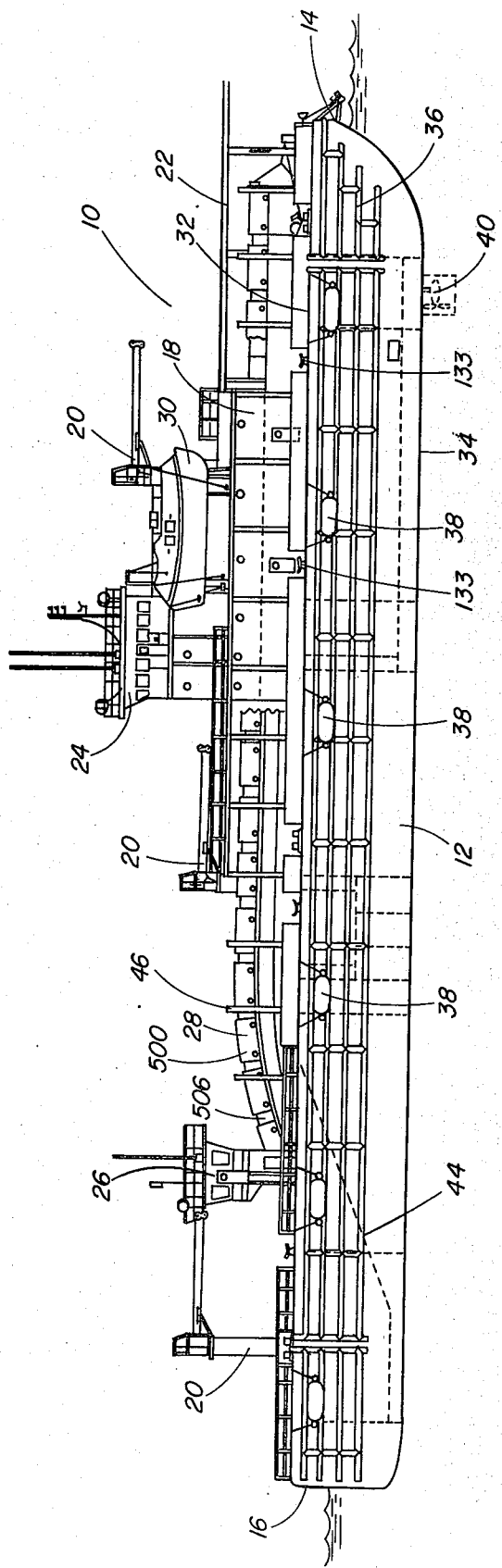
FIG. 1 is a side view of the open sea skimmer barge of the present invention.

Referring to FIG. 1, the open sea skimmer barge 10 of the present invention is shown in its preferred embodiment.

The open sea skimmer barge 10 comprises a hull 12 having a raked bow 14 and transom stern 16, deck house 18, cranes 20, helideck 22, control tower 24, skimmer control tower 26, oil booms 28 and life boats 30. Of course, similar or other hull and superstructure arrangements are acceptable for use.

The main deck 32 of the hull 12 is constructed having no camber or shear and the bottom 34 of the hull 12 is constructed having no deadrise. The hull 12 is further constructed having a bilge radius, having rub rails 36, having a plurality of suitable fenders 38 thereabout, having retractable bow thrusters 40 on each side of the raked bow 14, having a transverse stern thruster 42 (see FIG. 8), having aft ramps 44 for the deployment and retrieval of the oil booms 28, having oil boom storage supports 46 on the port and starboard side thereof for the storage of the oil booms 28 when not in use, and a centerline entry slot 48 (see FIG. 8) at the transom stern 16 for the entry of the spillage into the hull 12.

The hull 12 further contains various compartments and equipment not shown in FIG. 1 which will be described hereafter.

Figure 2:
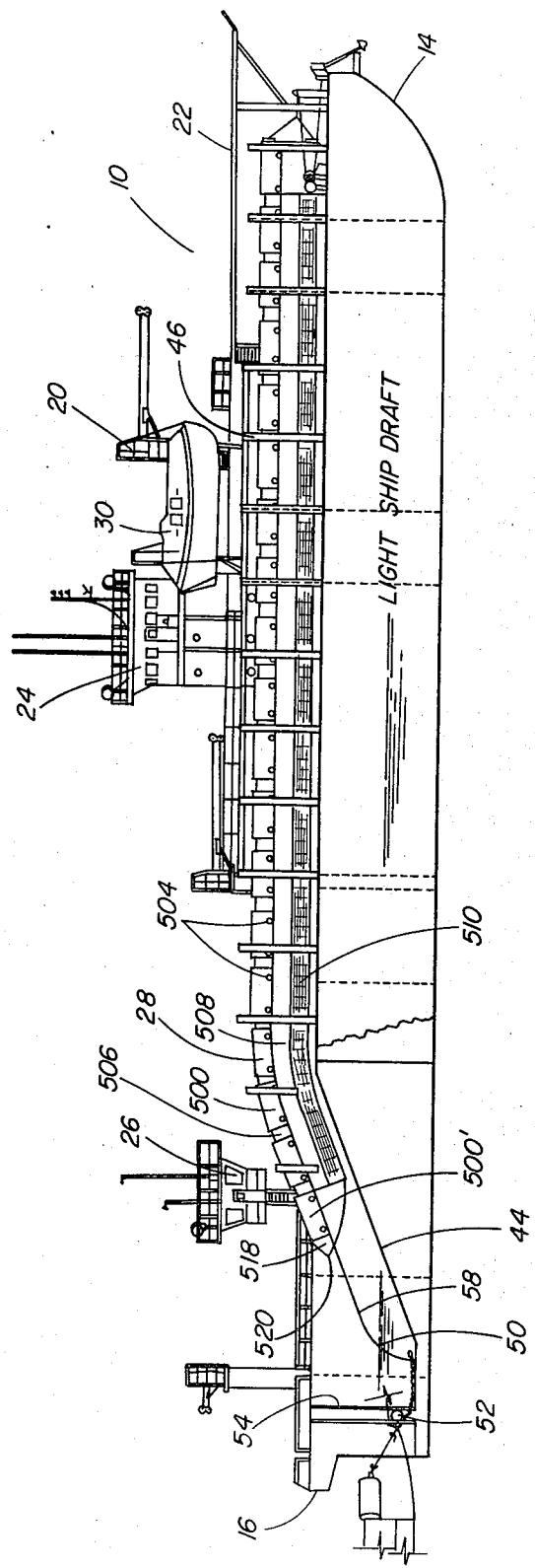
FIG. 2 is a partial cutaway side view of the open sea skimmer barge of the present invention showing an oil boom in its stored position and in its partially deployed position.

Referring to FIG. 2, the open sea skimmer barge 10 is shown in a partial cutaway view showing one of the aft ramps 44 for the deployment and retrieval of the oil booms 28. The aft ramps 44 extend along a portion of aft portion of the hull 12 on either side thereof. The aft ramps 44 provide a surface along which the oil booms 28 may be transported from their storage position on oil boom storage rails 46 when the booms 28 are being deployed and retrieved.

The aft ramps 44 terminate along the aft portion of the hull 12 having the ends 50 of the track ramps 58 being arcuately shaped for the guidance of the booms 28 with respect to the hull 12 when the open sea skimmer barge 10 is not loaded and at an even keel.

When the booms 28 are deployed, as partially illustrated, to control the relationship of the boom height with respect to the stern 16 to compensate for draft changes of the barge 10, the lines securing the boom 28 to the barge 10 are positioned about a guide roller 52 which is movably retained in track 54. The guide roller 52 may be vertically adjusted with respect to the hull 12 by any suitable means secured thereto, such as a pair of traveling nuts mounted on a powered screw-threaded member secured in slides.

Figure 3:
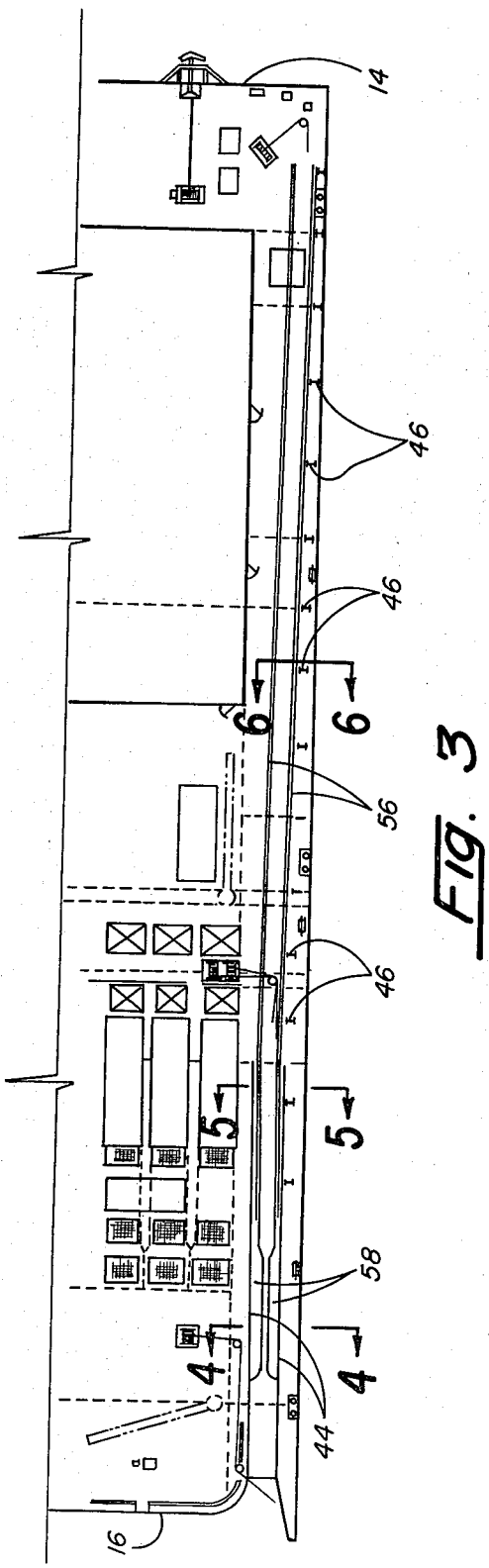
FIG. 3 is a partial plan view of the main deck of the open sea skimmer barge of the present invention.

Referring to FIG. 3, a partial planform view of the main deck of the open sea skimmer barge 10 is shown.

As shown, each aft ramp 44 supports track ramp 58 and a portion of a track 56 which extends throughout approximately the entire length of the barge 10 being supported by oil boom storage supports 46 where not secured to the aft ramp 44 having track ramp 58 thereon.

Figure 4:
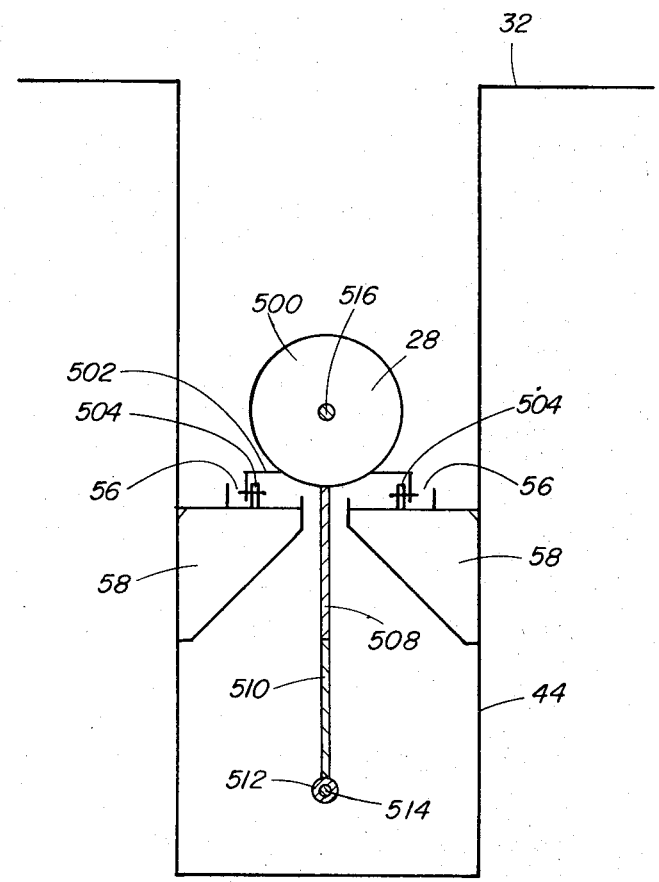
FIG. 4 is a cross-sectional view along line 4—4 of FIG. 3.

Referring to FIG. 4, the oil boom 28 is shown being supported by the track 56 which is, in turn, supported by track ramp 58 secured to the sidewalls of an aft ramp 44. As shown, the bottom of the oil boom 28 is provided with sufficient clearance to permit the free movement of the boom 28 along each aft ramp 44 without interfering therewith.

Figure 5:
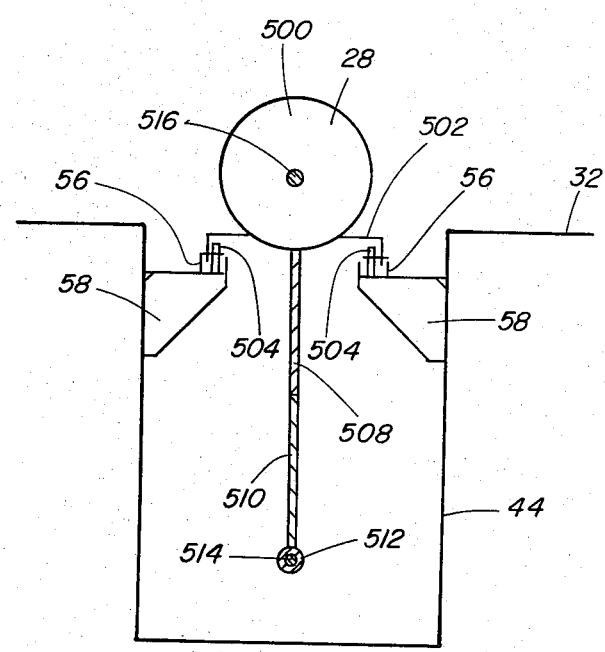
FIG. 5 is a cross-sectional view along line 5—5 of FIG. 3.

Referring to FIG. 5, the oil boom 28 is again shown being supported by the track 56 which is, in turn, supported by track ramp 58 secured to the sidewalls of an aft ramp 44.

Figure 6:
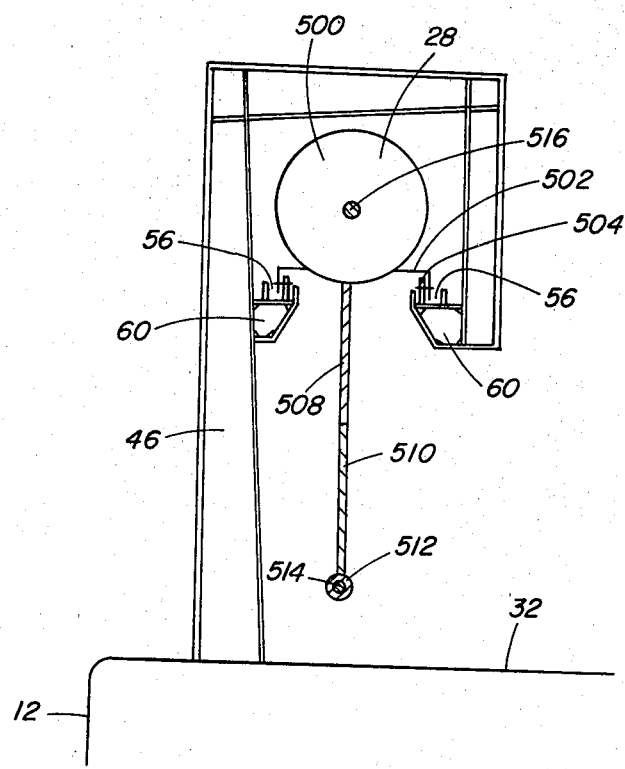
FIG. 6 is a cross-sectional view along line 6—6 of FIG. 3.

Referring to FIG. 6, the oil boom 28 is shown being supported by the track 56, which is, in turn, supported by brackets 60 secured to an oil boom storage support 46. As shown, the bottom of the oil boom 28 is provided with sufficient clearance to permit the free movement of the boom 28 along the main deck 32 without interfering therewith during deployment and retrieval operations.

Referring to FIGS. 1 through 6, it can be easily seen that each oil boom 28 comprises a plurality of boom floats 500 having transverse supports 502 secured thereto having, in turn, rotatable wheels 504 thereon which are received in the tracks 56, flexible member 506 interconnecting the boom floats 500, impermeable boom apron 508 secured to the bottom of boom floats 500 and flexible members 506 and permeable boom apron 510 secured to the bottom of impermeable boom apron 508 having a suitable line 514 retained within the bottom 512 of the permeable apron 510.

Running through the boom floats 500 is a line 516 suitable for use in towing operations of the open sea skimmer barge 10.

The first boom float 500' has an attachment means 518 secured thereto which is, in turn, secured to line 516, impermeable apron 508, permeable apron 510 and line 514. An attachment ring or other suitable means is included on end 520 of attachment means 518 for a line from a suitable towing means to be secured thereto.

The line 514 contained within the bottom 512 of the permeable apron 510 is utilized to weight the aprons 508 and 510 to maintain them in a submerged state and provide stability to the oil boom 28 during skimming operations.

Figure 7:
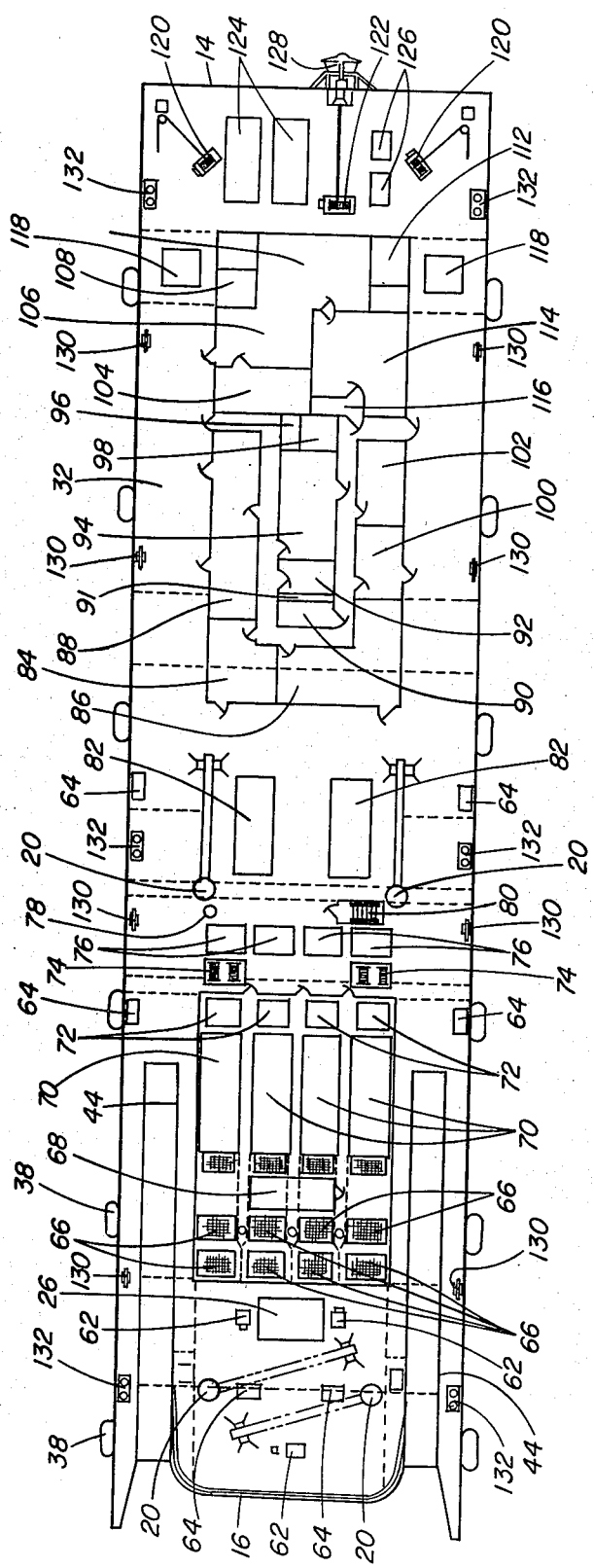
FIG. 7 is a plan view of the main deck of the open sea skimmer barge of the present invention.

Referring to FIG. 7, the main deck 32 is shown in planform. As shown, the main deck 32 has a plurality of pedestal cranes 20 located thereon to assist in loading and unloading operations of the open sea skimmer barge 10. The stern portion of the main deck 32 includes a plurality of winches 62 to assist in line handling operations and a plurality of washing units 64 for cleaning operations, particularly in the deployment and retrieval of the oil booms 28. The stern portion of the main deck 32 further includes the base portion of the skimmer control tower 26, which is utilized for deck observation, communication, skimmer control and storage purposes.

Forward of the stern portion of the main deck 32 are a plurality of observation hatches 66 which allow the observation of the spillage contained within the forward portion of the oil collection tank therebelow.

Forward of the observation hatches 66 is a deck storage compartment 68 for the storage of equipment or stores therein.

On the forward side of the storage compartment 68 are a plurality of filter belt hatches 70 which allow access to the secondary filter belt separation means 230 (not shown) located in the oil collection tank 144 therebelow.

Forward of the filter belt hatches 70 are a plurality of sump hatches 72 which allow access to the sump 150 for the secondary oil separation means 230 (not shown) located in the oil collection tank 144.

Forward of the sump hatches 70, located on the port and starboard side of the open sea skimmer barge 10, are auxiliary boom winches 74 which assist in the deployment and retrieval of the oil booms 28.

Slightly aft and outboard of the auxiliary boom winches 74 are washing units 64 which are utilized to clean the oil booms 28 when retrieving and storing the booms 28 on storage supports 46 (not shown).

Forward of the auxiliary boom winches 74 are a plurality of pump hatches 76 which allow access to the pumping means therebelow, while forward of the pump hatches 76 and aft of the cranes 20, located amidship of the open sea skimmer barge 10 on the port side of the barge 10, is an escape scuttle 78, and located on the starboard side is an enclosed stairway 80 leading to below decks.

Located approximately amidships inboard of the cranes 20 thereat are tertiary oil separation means 82 which may be of any suitable separation device, such as a gravity, electrostatic or centrifuge type separation device.

Located outboard of the tertiary oil separation means 82 are washing means 64 which assist in the cleaning of the oil booms 28 during retrieval and storing of the booms 28 on storage supports 46 (not shown).

Forward of the cranes 20 and tertiary oil separators 82 is the main deck portion of the deck house 18. The main deck portion of the deck house 18 includes storage area 84, workshop 86, locker room 88, stairwell 90, control line trunk 91, storage room 92, laundry 94, pipe chase 96, equipment removal trunk 98, auxiliary generator 100, air handling equipment area 102, refrigerated storage 104, dry storage area 106, supply storage 108, galley 110, supply storage 112, mess 114 and stairwell 116 leading to below decks.

Located in the outboard portion of the main deck portion of the main deck 32 near the bow 14 of the open sea skimmer barge 10 are bow thruster hatches 118 which allow access to the retractable bow thrusters 40 located therebelow.

Located on the bow portion of the main deck 32 are oil boom winches 120, anchor winch 122, chemical dispensant storage tanks 124, jet fuel storage tanks 126 and anchor 128.

Located at various positions on the port and starboard sides of the main deck 32 are a plurality of padeyes 130, bitts 132 and cleats 133 (not shown, see FIG. 1).

Figure 8:
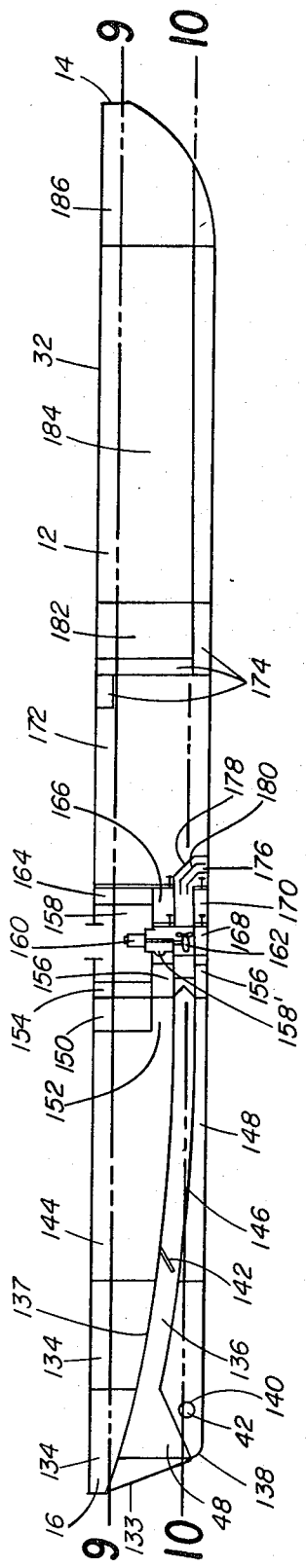
FIG. 8 is a cross-sectional view along the centerline of the hull of the open sea skimmer barge of the present invention.

Referring to FIG. 8, the hull 12 is shown in cross section.

Starting at the stern 16, the stern portion of the hull 12 includes ballast tanks 134, spill suction tunnel centerline entry slot 48, entry slot bars 133, and stern thruster compartment 138 having transverse stern thruster tunnel 140 having, in turn, stern thruster 42 therein. The ballast tanks 134 are utilized for trimming the open area skimmer barge 10 during skimming, boom launching and retrieval, and towing operations. The stern thruster compartment 138 is ventilated and provided with access from the main deck 32 through hatches (not shown).

Forward of the stern portion of the hull 12, the spill suction tunnel 136 is provided with a plurality of movable flaps 142 which allow spillage and water to flow into oil collection tank 144 during skimming operations. The flaps 142 are movable between a closed position where they sealingly engage the bottom of the oil collection tank 144 forming a portion thereof to a fully extended position where they abut the bottom 146 of the spill suction tunnel 136. The flaps 142 may be powered by any suitable means, such as remotely controlled hydraulic actuators.

Contained within the oil collection tank 144 are a plurality of secondary oil separation means (not shown) in individual compartments (not shown).

The spill suction tunnel 136 is located below the oil collection tank 144 and located below spill suction tunnel 136 are a plurality of ballast tanks 148 which are utilized to ballast the open sea skimmer barge 10.

Located forward of oil collection tank 144 are sump 150, induction space header 152, cofferdam 154, access space 156, pump room 158 having a plurality of pump power means 160 therein driving a plurality of pumping means 162 located in spill suction tunnel 136, cofferdam 164 and access space 166. Located below the spill suction tunnel 136 and forward of ballast tanks 148 are access space 156, spill compartment 168 and compartment 170.

Forward of the pump room 158 and cofferdam 164 are recovered oil tanks 172 having cofferdams 174 at the forward end thereof and the outlet 176 of the spill suction tunnel 136. The outlet 176 of the spill suction tunnel 136 comprises a transition section 178 having flow deflectors 180 therein. The transition section 178 having flow deflectors 180 therein turns the fluid flow after discharging from the pumping means 162 in the spill suction tunnel 136 through approximately a ninety degree (90°) angle so that the fluid discharge from the outlet 176 of the spill suction tunnel 136 neither produces nor induces any forward or aft thrust on the open sea skimmer barge 10.

Forward of the cofferdams 174 are potable water storage compartment 182, machinery space 184 and bow ballast tanks 186 which are utilized for ballasting of the open sea skimmer barge 10 during maintenance operations.

Figure 9:
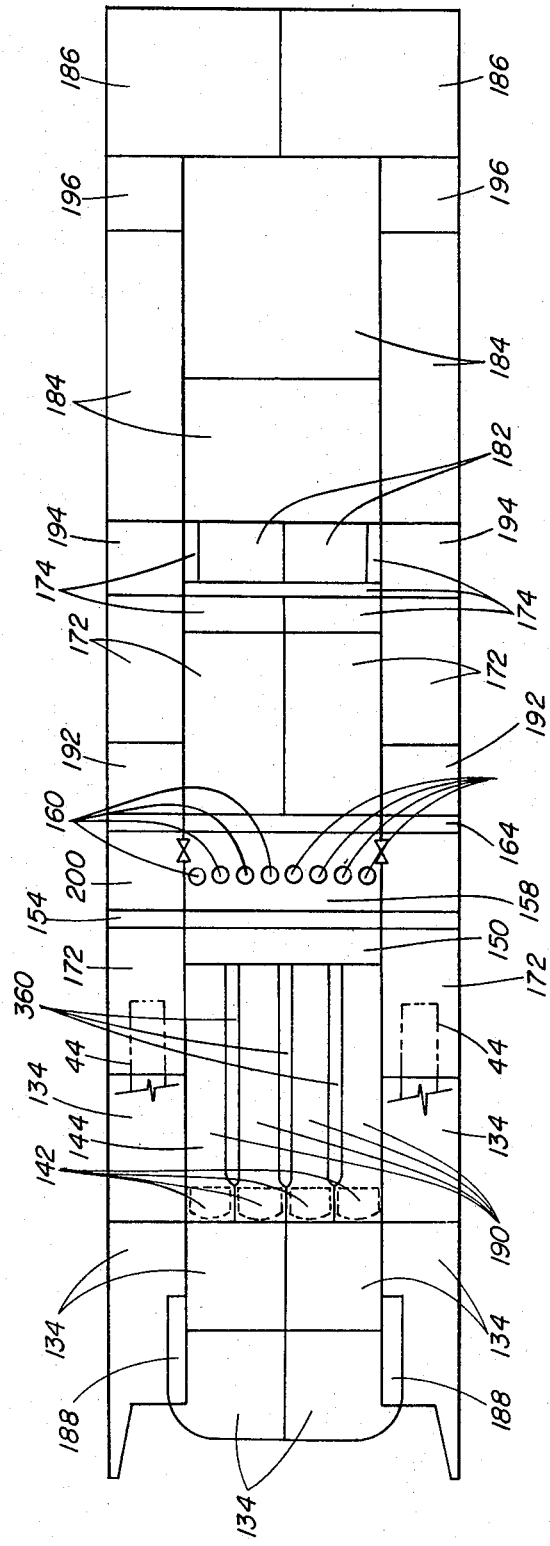
FIG. 9 is a plan view below the main deck of the open sea skimmer barge of the present invention.

Referring to FIG. 9, the various compartments of the open sea skimmer barge 10 are shown at a level below the main deck 32 along section line 9—9 of FIG. 8. The stern portion of the hull 12 includes ballast tanks 134 and access compartments 188 which provide access to the stern thruster compartment 138.

Located forward of the stern portion of hull 12 is oil collection tank 144 having a plurality of individual compartments 190 therein, each compartment 190 having, in turn, a secondary oil separation means (not shown) located therein. Shown in phantom are the flaps 142 which allow spillage and water to flow into the oil collection tank 144 during skimming operations.

Located outboard of the oil collection tank 144 are ballast tanks 134 and recovered oil tanks 172. It should be remembered that the aft ramps 44 (shown in phantom) which are utilized for the deployment and retrieval of the oil booms 28 extend into the hull 12 and through portions of ballast tanks 134 and recovered oil tanks 172 which are outboard of oil collection tank 144.

As shown, forward of oil collection tank 144 are sump 150 which receives spillage from the secondary oil separation means, cofferdam 154, pump room 158 having power means 160 therein, and cofferdam 164.

Located forward of cofferdam 164 are primary recovered oil tanks 192, recovered oil tanks 172, cofferdams 174, potable water tanks 182, fuel oil tanks 194, machinery space 184, bow thruster compartments 196 and ballast tanks 186.

Referring to FIG. 10, the various compartments of the open sea skimmer barge 10 are shown at the tank top level along section line 10—10 of FIG. 8. The stern portion of the hull 12 includes ballast tanks 134, access compartments 188 which provide access to stern thruster compartment 138.

Located forward of the stern portion of the hull 12 are ballast tanks 134, ballast tanks 198, and recovered oil tanks 172. As shown, the aft ramps 44 extend through portions of ballast tanks 134 and recovered oil tanks 172.

Continuing forward amidships extend access space 156, spill compartment 168 and compartment 160, while located outboard thereof are induction sumps 200 having induction pumping means (not shown) therein to remove water from oil collection tank 144 during skimming operations and recovered oil bilge sections 202.

Again, continuing forward located amidships are recovered oil tanks 172 and located outboard thereof are primary recovered oil tanks 192 and recovered oil tanks 172.

Forward thereof are fuel oil tanks 194, cofferdam 182, machinery space 184, bow thruster compartments 196 and ballast tanks 186.

Referring to FIG. 11, the deck house 18 is shown.

At the main deck 32, the deck house 18 includes from aft forward, workshop 86, stairwell 90, control line trunk 91 running from the main deck to the control tower 228, storage room 92, laundry 94, equipment removal trunk 98, mess 114 and galley 110.

Along the first upper deck 204, the deckhouse 18, includes a lounge area 206, stairwell 208, storage area 210, crew shower areas 212, toilet 214, equipment removal trunk 216, air handling equipment 218 and open area 214.

Along the second upper deck 216, the deckhouse 18 includes an office 218, stairwell 220, crew quarters 222, deck storage 224 and helideck 22.

Along the third upper deck 226, the control tower 228 for the open sea skimmer barge 10 is provided.

It should be noted that a trolley hoist (now shown) is located under the helideck for various lifting operations. The trolley hoist may be of any suitable type, such as a geared trolley type.

Figure 12:
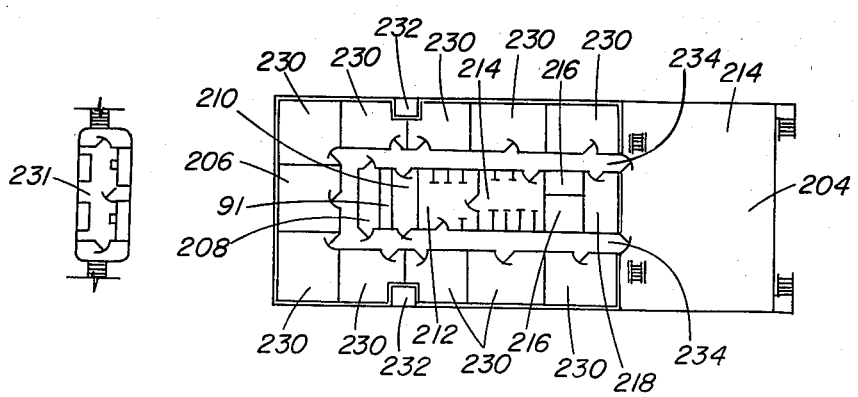
FIG. 12 is a plan view along line 12—12 of FIG. 11 including the skimming control tower.

Referring to FIG. 12, the first upper deck 204 is shown in planform. The first upper deck 204 includes from aft to forward lounge 206, stairwell 208, control line trunk 91, storage areas 210, showers 212, toilet 214, equipment trunk 216, air handling equipment 218, crew quarters 230, vents 232, passageways 234 and open area 214.

In the skimming control tower 26, the control tower 26 has a control room 231 from which the operation of the open sea skimmer barge is controlled during skimming operations of the spillage.

Figure 13:
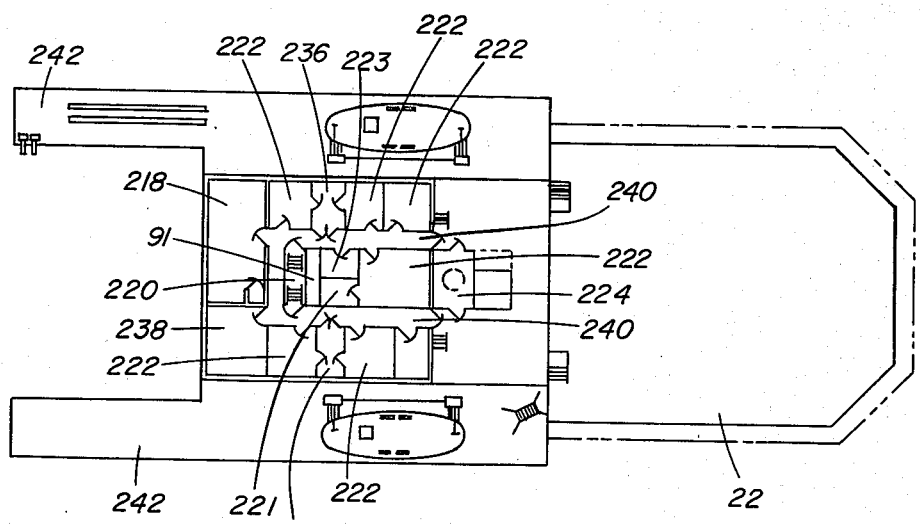
FIG. 13 is a plan view along line 13—13 of FIG. 11.

Referring to FIG. 13, the second upper deck 216 is shown in planform. The second upper deck 216 includes from aft to forward office 218, stairwell 220, control line trunk 91, toilet and shower 221, crew quarters 222, storage areas 223 and 224, lavatories 236, lounge 238, passageways 240, and boat deck and hose handling platforms 242.

Figure 14:
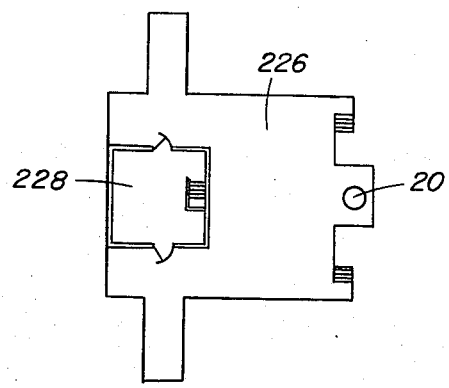
FIG. 14 is a plan view along line 14—14 of FIG. 11.

Referring to FIG. 14, the third upper deck 226 is shown in planform. The third upper deck 226 includes the control tower 228, pedestal crane 20 and an open area surrounding the control tower.

Figure 15:
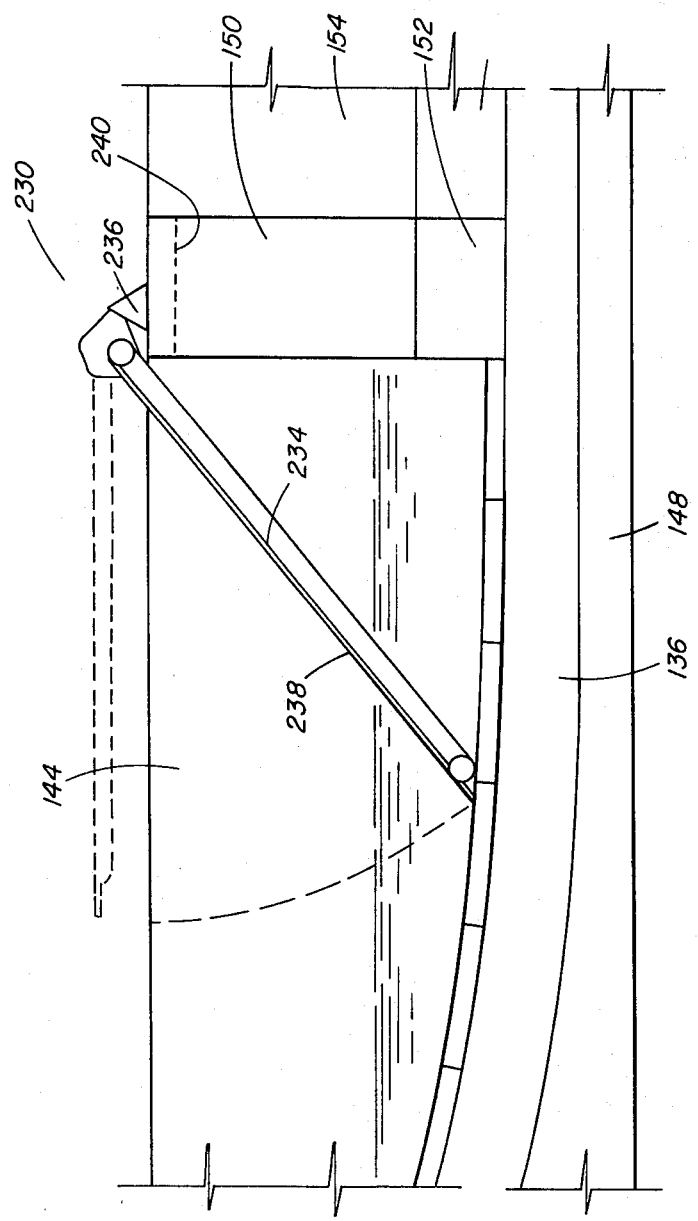
FIG. 15 is a cross-sectional of the secondary oil separation means utilized on the open sea skimming barge of the present invention.

Referring to FIG. 15, a secondary oil separation means 230 contained within oil collection tank 144 is shown. The secondary oil separation means 230 comprises a filter belt module, each filter belt module having framework 234 supported at its upper end by a support 236 and having one or more porous oleophilic polyurethane mesh backed by a nylon and bronze web 238 reinforcement being rotatably mounted over the framework 234 and powered by a suitable power means. Each filter belt is additionally fitted with an adjustable spring loaded scraper bar (not shown) to scrape trash therefrom.

In its operational position the secondary oil separation means 230 has one end thereof lowered to or resting on the bottom of the oil collection tank 144 extending into the spillage and water therein. Spillage is conveyed upwardly on the filter belts 238 by rotating the same and being subsequently removed therefrom by a squeeze roller (not shown) pressing against a roller at the upper end of the belt 238. The spillage drops from the filter belt 238 upon squeezing into sump 150 while trash which is scraped from the filter belt 238 is retained on trash screen 240. Spillage is subsequently pumped from sump 150 by suitable pump means (not shown) to the tertiary oil separation means 82.

Water is removed from the oil collection tank 144 via induction header 152 by induction pumping means (not shown) which are contained in induction sumps 200 and subsequently pumped overboard through piping which exits beneath the barge.

When stored, each secondary oil separation means 230 is raised to its horizontal position (shown in broken lines) by a suitable winch means (not shown) and maintained in a horizontal position during storage.

Figure 16:
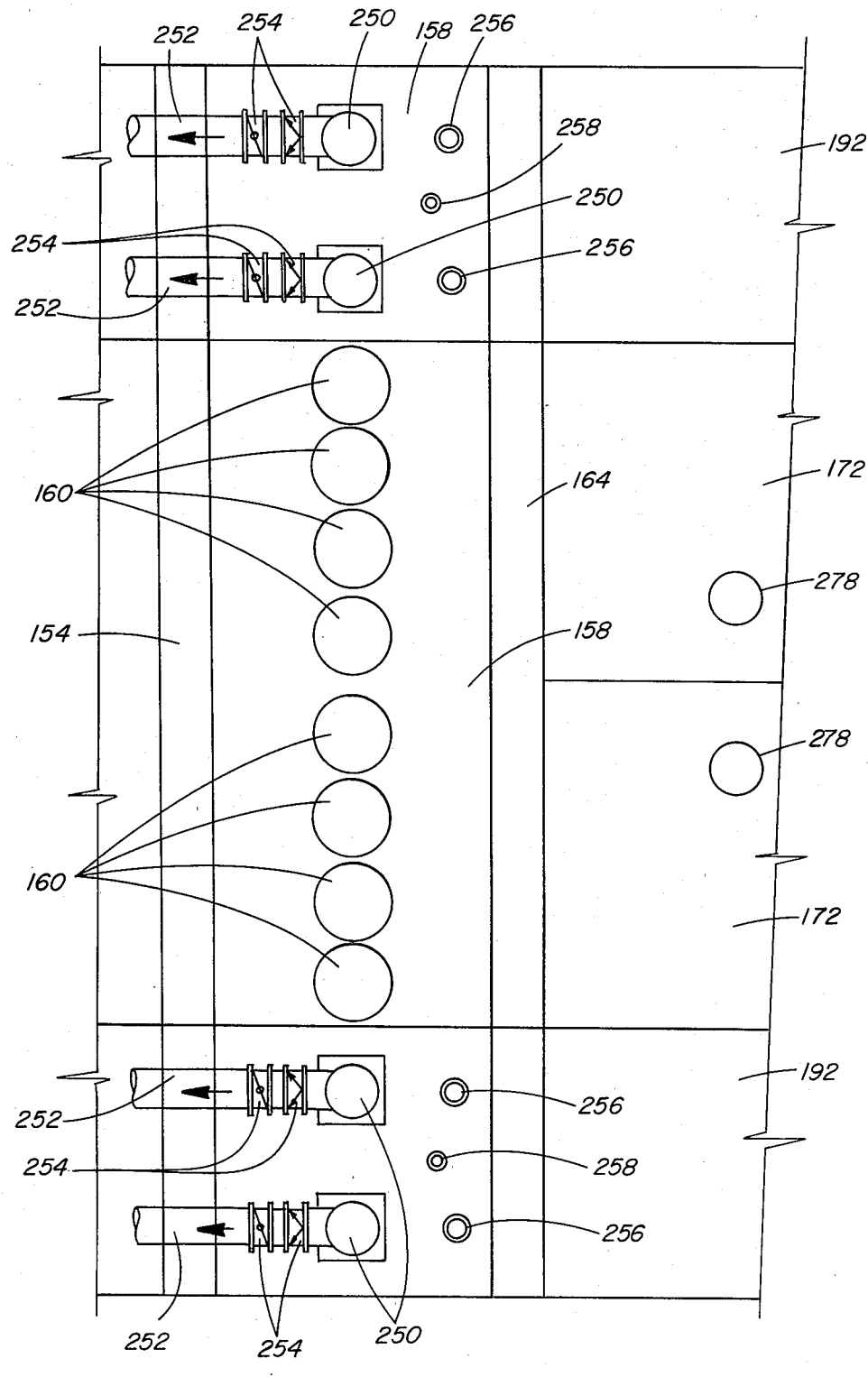
FIG. 16 is a plan view between decks in the pump room area.

Referring to FIG. 16, the pump room 158 is shown at a level between decks. The pump room 158 is located between cofferdams 154 and 164. The pump room 158 contains a plurality of pump power means 160 therein to drive pumping means 162 located in spill suction tunnel 136, a plurality of induction pumps 250 therein having outlet lines 252 interconnected by valve means 254 to the pumps 250, a plurality of recovered oil pump motor means 256 therein, and a plurality of bilge pump motor means 258 therein.

Contained within recovered oil tanks 172 are inlet pipes 278 for the offloading recovered oil pump means 276.

Figure 17:
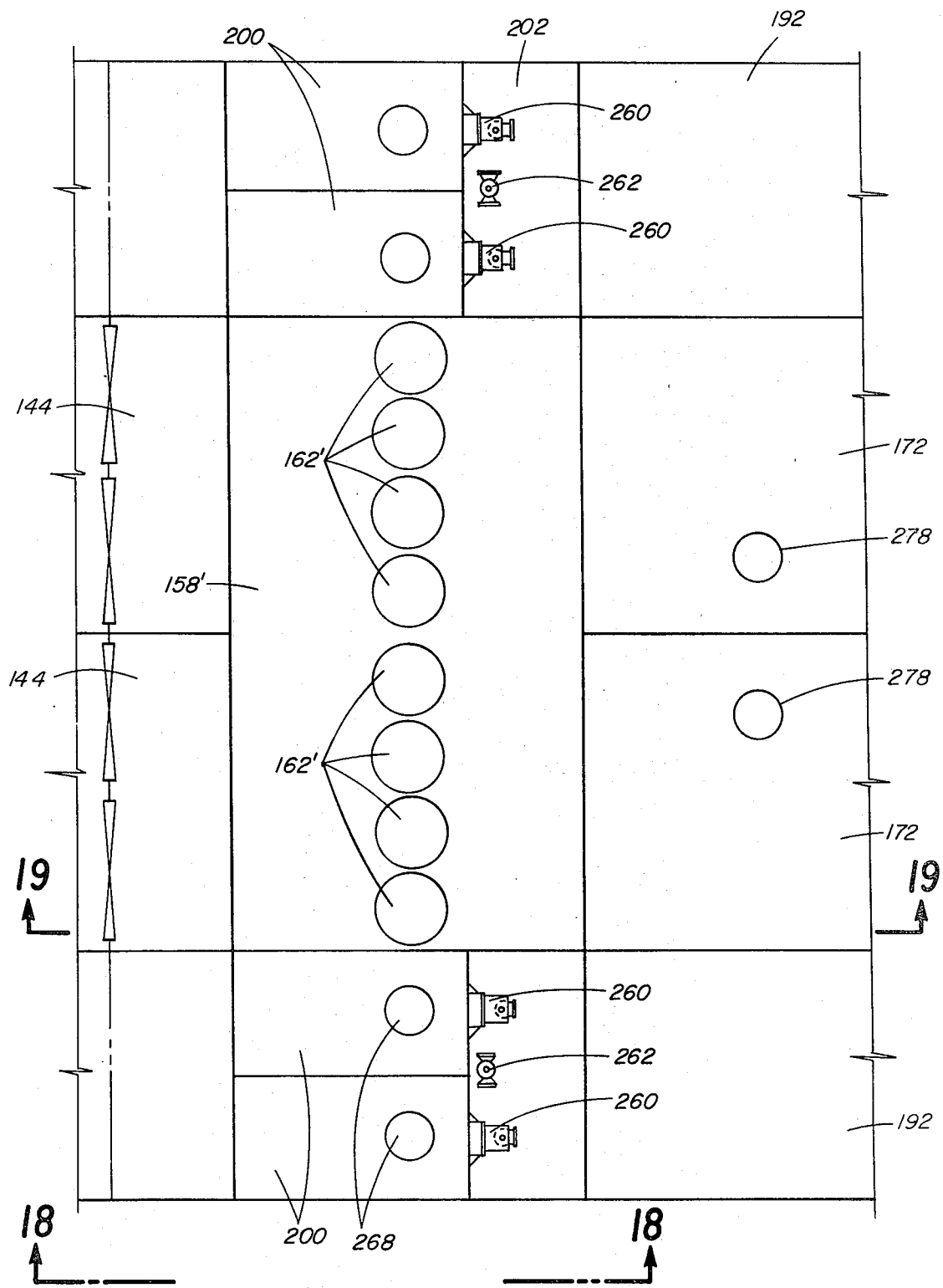
FIG. 17 is a plan view in the pump room area along section line 10—10 of FIG. 8.

Referring to FIG. 17, the lower pump room 158', induction sumps 200 and bilge tanks 202 are shown in cross section. The lower pump room 158' contains the upper portion 162' therein of the pump means 162 contained within spill suction tunnel 136. The induction sumps 200 contain the lower portion of the induction pumps therein while the bilge tanks 202 contain recovered oil pumps 260 therein and bilge pumps 262 therein.

Figure 18:
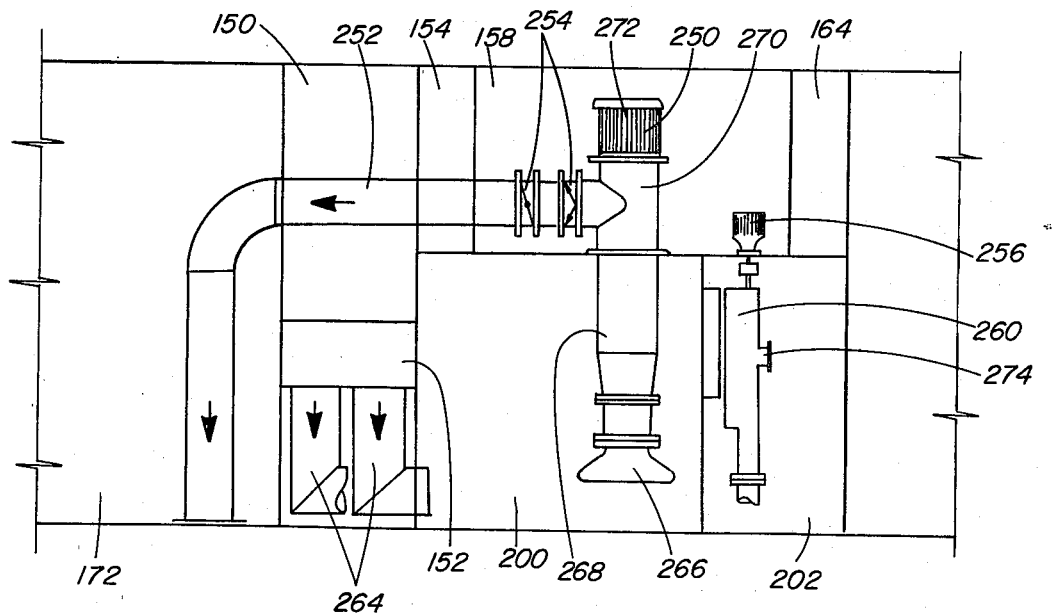
FIG. 18 is a cross-sectional view along section line 18—18 of FIG. 17.

Referring to FIG. 18, the pump room 158, induction sumps 200 and bilge tanks 202 are shown in cross section. The induction sumps 200 are connected to the induction header 152 by flow lines 264. The induction pumps 250 comprise an inlet 266, flow line 268, pump means 270, and pump motor 272. The discharge from the pump means 270 flows through valve means 254 and outlet lines 252 overboard.

The recovered oil pumps 260 are fed by lines (not shown) connected to the sump 150 and discharge from pump exit 274 via lines (not shown) into the various recovered oil tanks.

Figure 19:
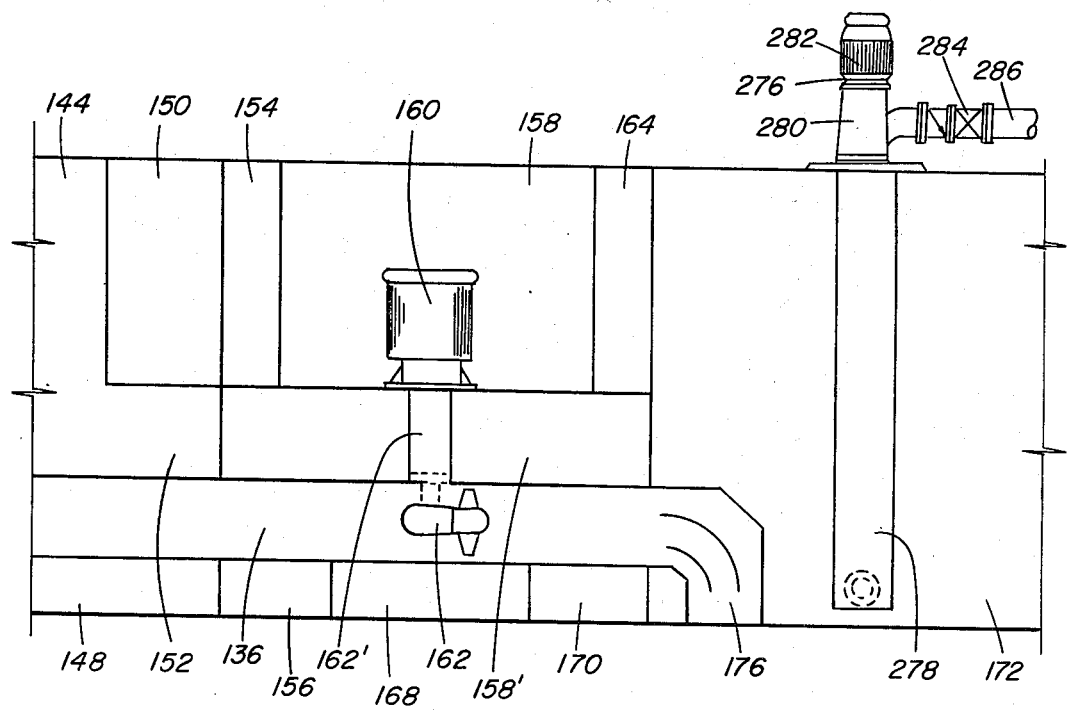
FIG. 19 is a cross-sectional view along section line 19—19 of FIG. 17.

Referring to FIG. 19, the offloading recovered oil pump means 276 is shown. The offloading recovered oil pump means 276 comprises inlet pipe 278, pump means 280, motor means 282, discharge valves 284, and discharge conduit 286.

Referring to FIG. 20, the machinery room 184 is shown in plan view at the between deck level. At this level, the machinery room 184 includes chiller units 288 for the air conditioning system for the open sea skimmer barge 10, cooling units 290 for the refrigerated areas of the barge 10, chilled water pumps 292 for the air conditioning system for the barge 10, motor control centers 294, main switchboards 296, day fuel oil tank 298, cooling water expansion tank 300, sewage treatment plant 302, service air compressor 304, main air compressor 306, main air receiver 308, service air receiver 310, potable water heater 312 and incinerator 313. Also shown are vent trunks 314 and stairways 316.

Figure 21:
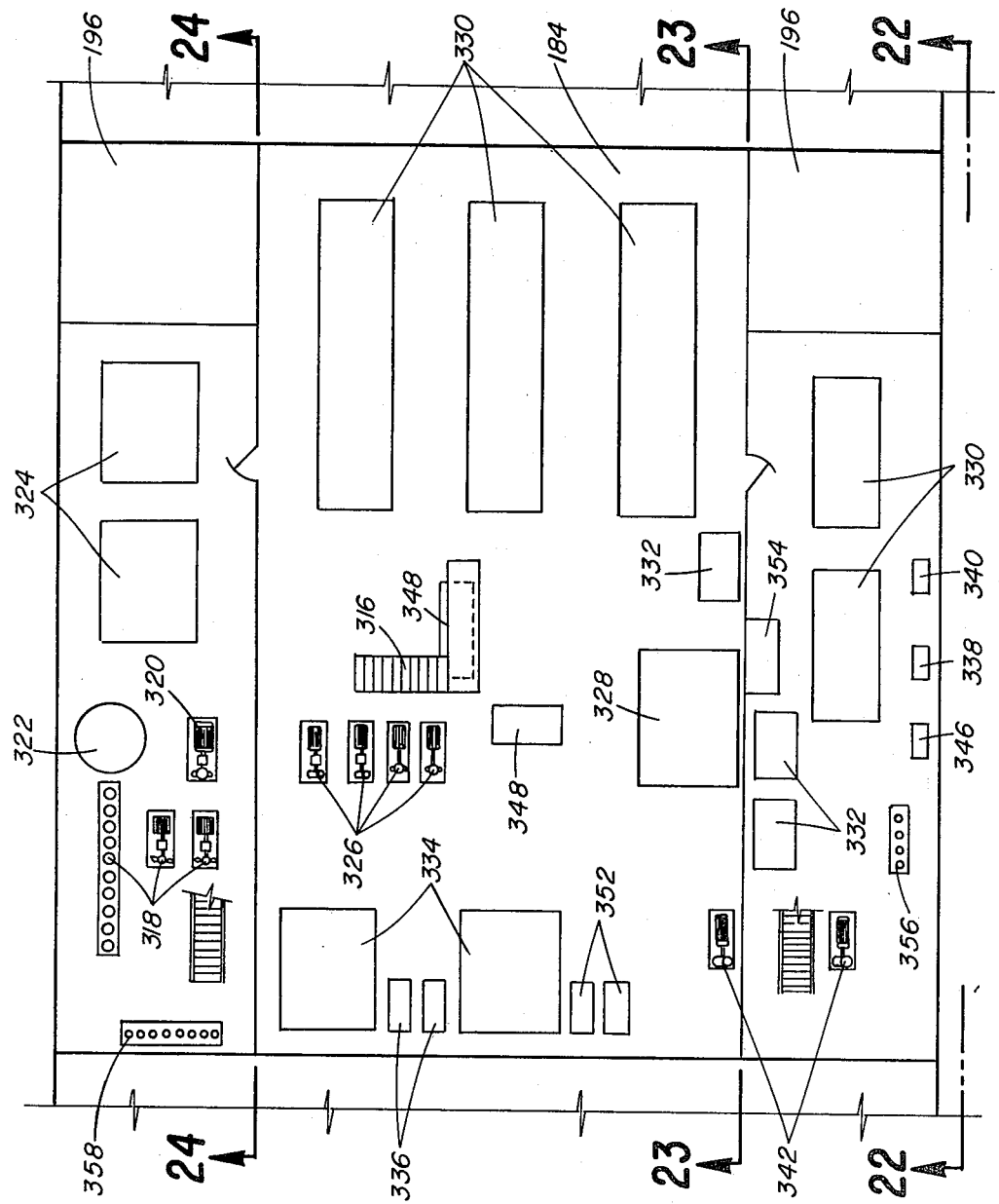
FIG. 21 is a plan view of the machinery room along section line 10—10 of FIG. 8.

Referring to FIG. 21, the machinery room 184 is shown in plan view. At this level, the machinery room 184 includes ballast pumps 318, bilge pump 320, bilge oil-water separator 322, recovered oil heaters 324, cooling water pumps 326, tank cleaning heat exchanger 328, generators 330, purifier units 332, fresh watermakers 334, potable water pumps 336, fuel oil transfer pumps 338, lube oil transfer pump 340, fire and general service pumps 342, dirty lube oil pump 346, generator heat exchangers 348, sludge pump 350 (not shown), sanitary flushing pumps 352, work bench 354, fuel oil manifold 356, ballast tank manifold 358, and stairway 316.

Figure 22:
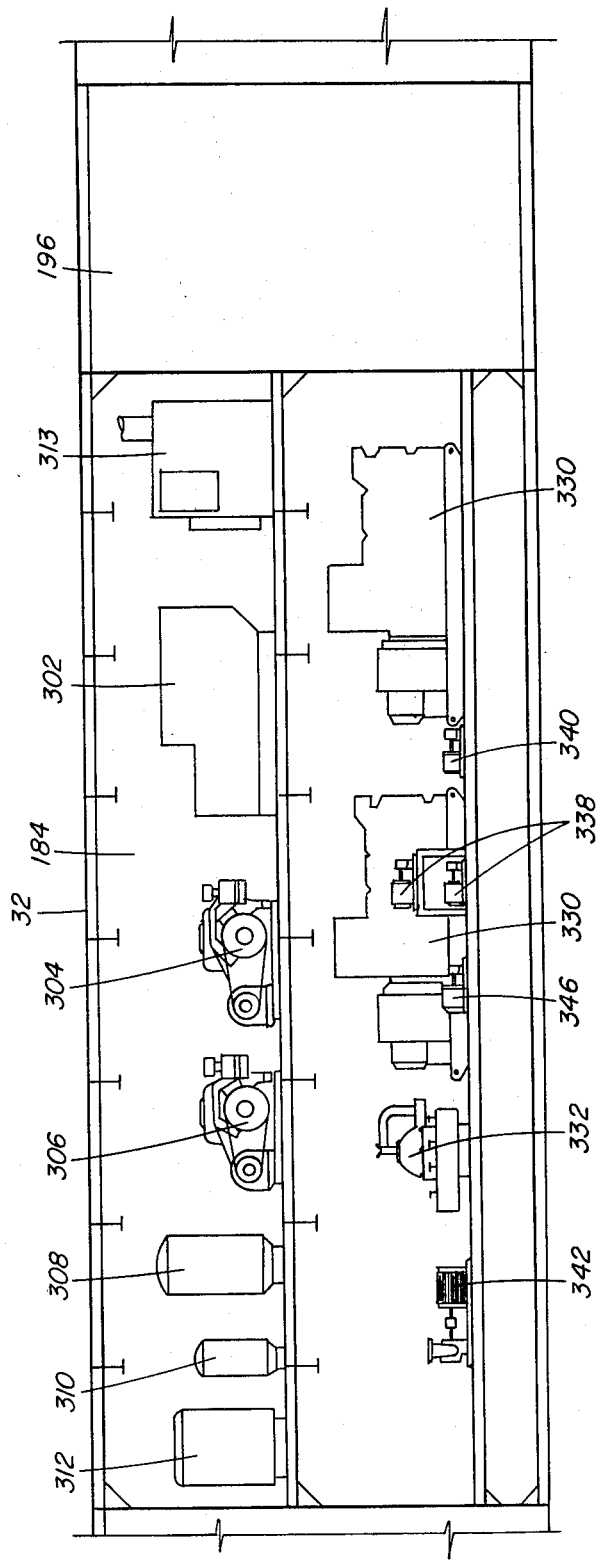
FIG. 22 is a cross-sectional view along section line 22—22 of FIG. 21.

Referring to FIG. 22, a portion of the machinery room 184 is shown in cross section. As shown, the machinery room includes sewage treatment plant 302, service air compressor 304, main air compressor 306, main air receiver 308, service air receiver 310, potable water heater 312, generators 330, purifier unit 332, fire and general service pump 342, fuel oil transfer pumps 338, lube oil transfer pump 340 and dirty oil pump 346.

Figure 23:
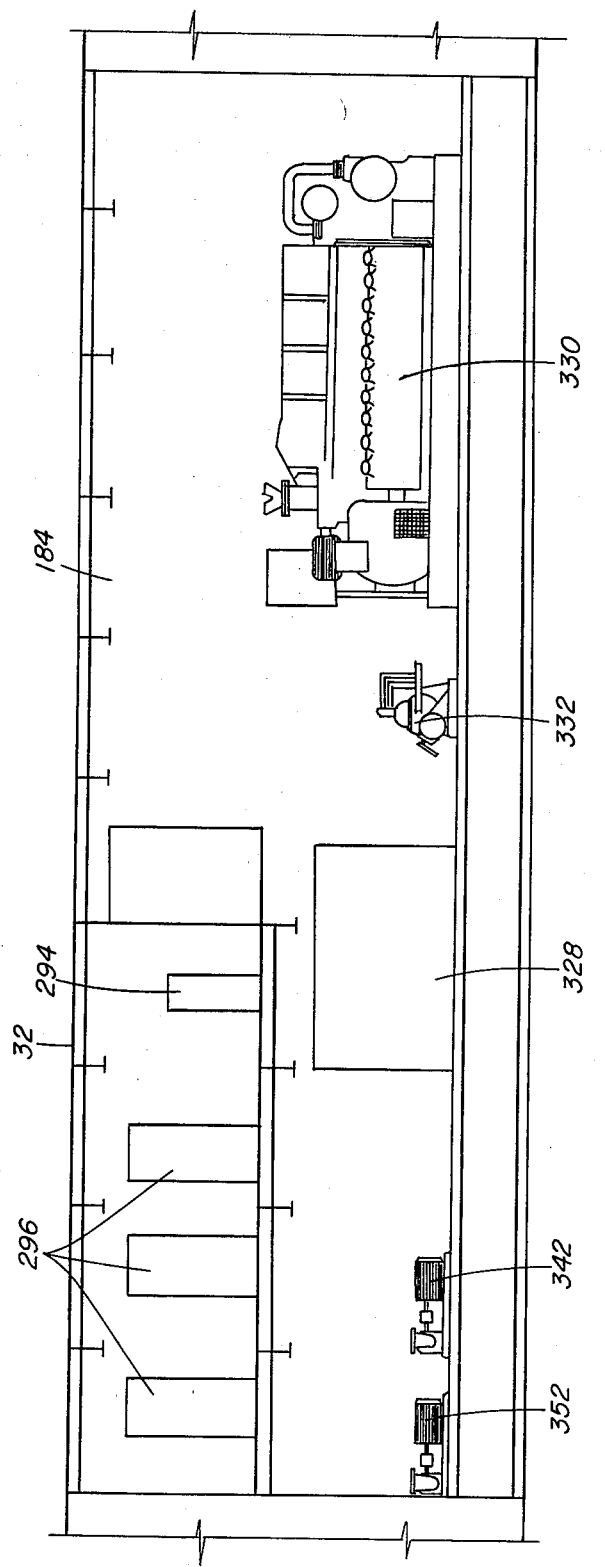
FIG. 23 is a cross-sectional view along section line 23—23 of FIG. 21.

Referring to FIG. 23, a further portion of the machinery room 184 is shown in cross section. It includes motor control center 294, main switchboards 296, tank cleaning heat exchanger 328, generator 330, purifier unit 332, fire and general service pump 342 and sanitary flushing pump 352.

Figure 24:
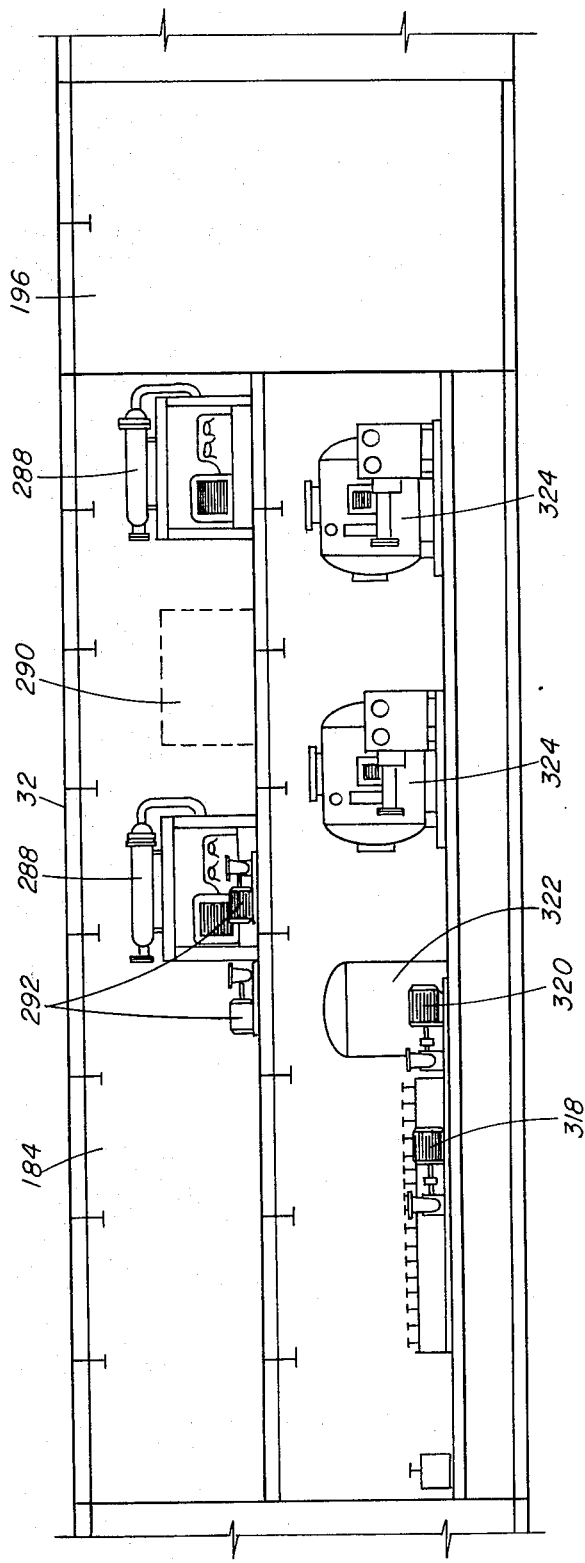
FIG. 24 is a cross-sectional view along section line 24—24 of FIG. 21.

Referring to FIG. 24, another portion of the machinery room 184 is shown in cross section. It includes chiller unit 288, chilled water pumps 292, ballast pump 318, bilge pump 320, bilge oil-water separator 322 and recovered oil heaters 324. The cooling units 290 for the refrigerated areas of the barge 10 have been omitted for clarity in this view.

Figure 25:
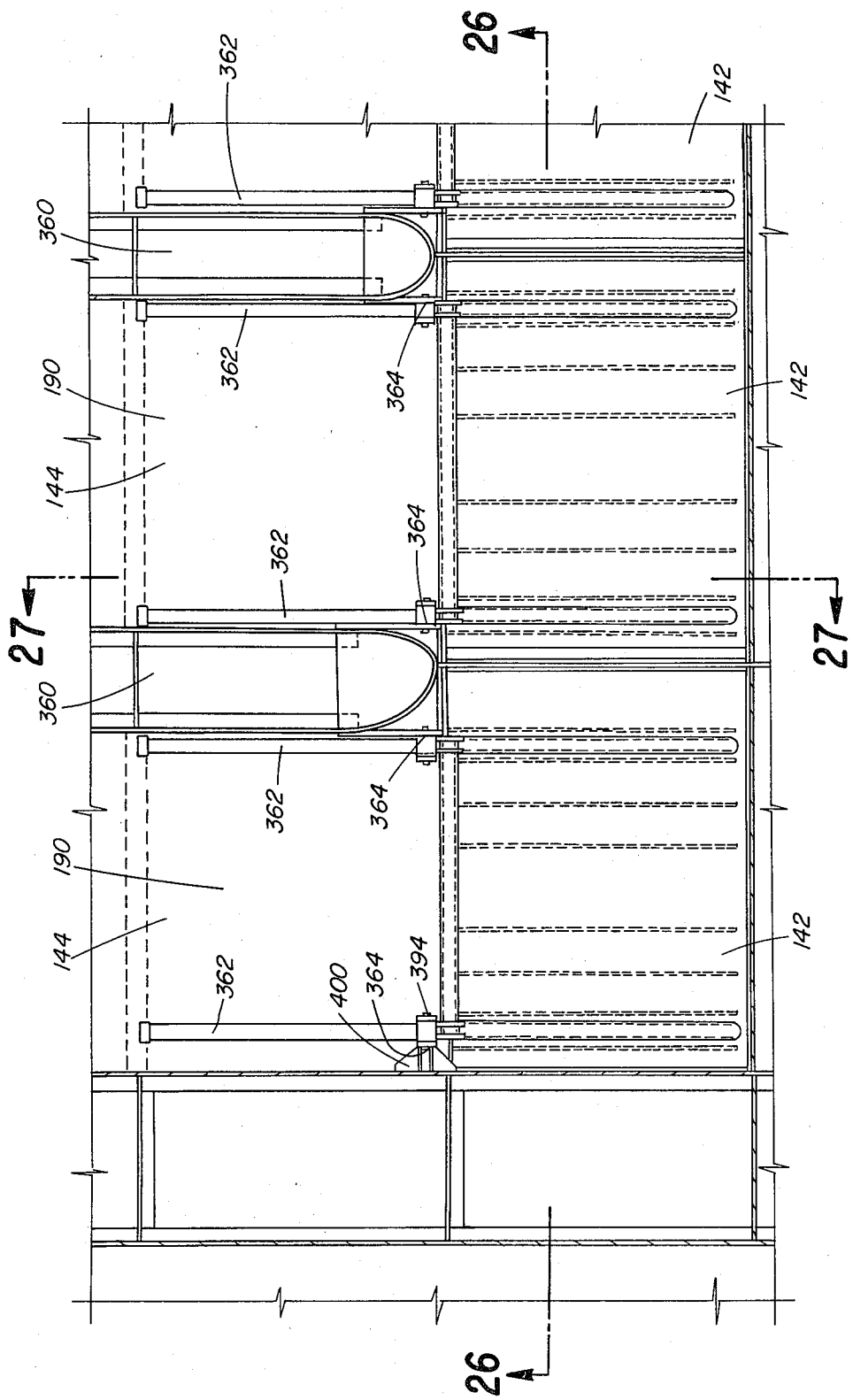
FIG. 25 is a plan view of the flap area of the spill suction tunnel of FIG. 8.

Referring to FIG. 25, the flaps 142 in the aft portion of the collection tank 144 are shown. The collection tank 144 is divided into secondary oil separation means 190 having partitions 360 running from the bottom to substantially the top of the collection tank 144 therebetween, each area 190 having secondary oil separation means 230 (not shown) therein. Each flap 142 is actuated by a plurality of hydraulic units 362 connected thereto which are rotatably secured at 364 to either the side wall of the collection tank 144 or portions 360. The hydraulic units 362 are, in turn, rotatably secured to the flaps 142.

Figure 26:
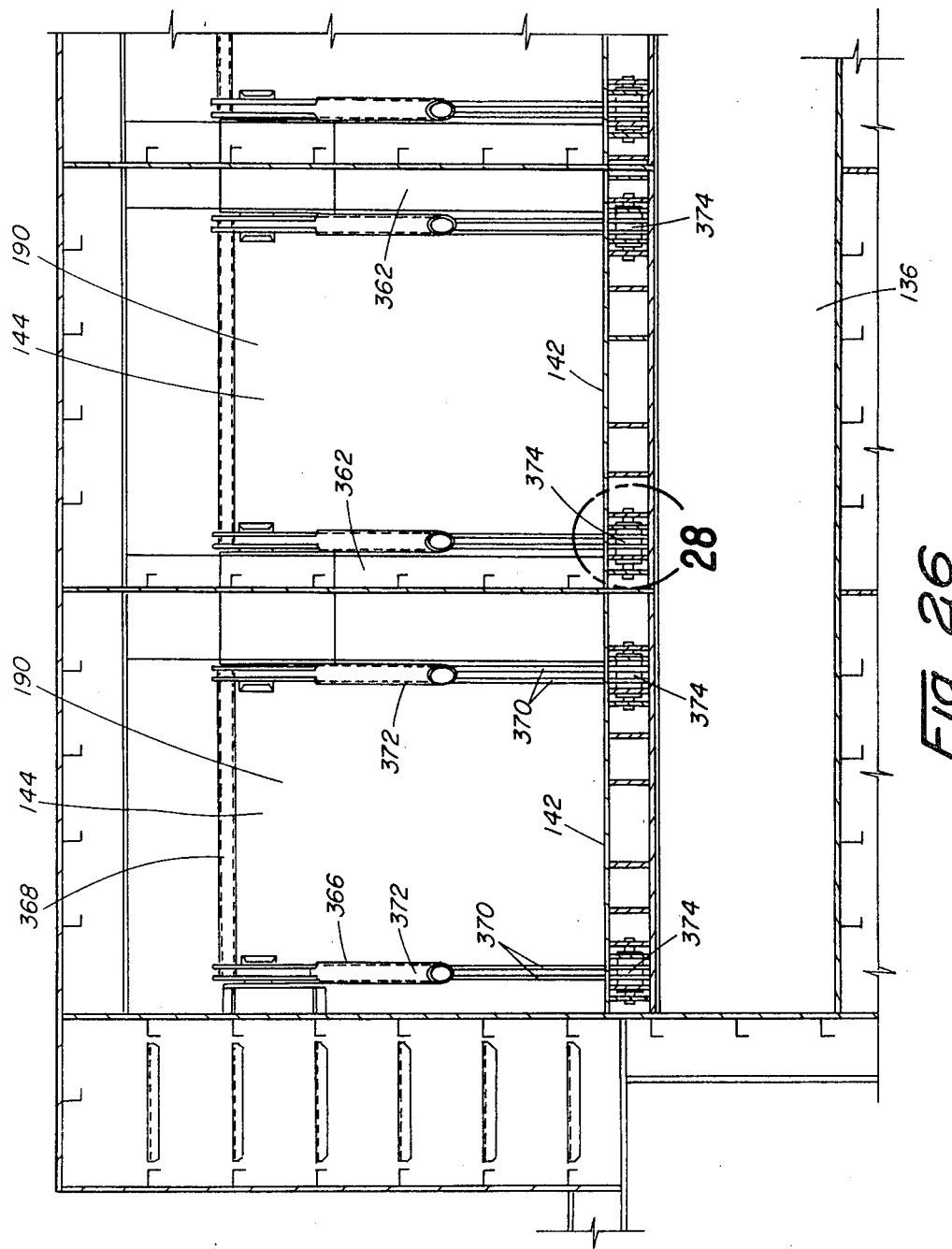
FIG. 26 is a cross-sectional view along section line 26—26 of FIG. 25.

Referring to FIG. 26, the flaps 142 are shown in cross section. Attached to the upper surface of the flaps 142 is a framework 366 comprising horizontal member 368, vertical members 370, and angular members 372. The flaps 142 are rotatably mounted at the rear thereof by means of hinge connections 374.

Figure 27:
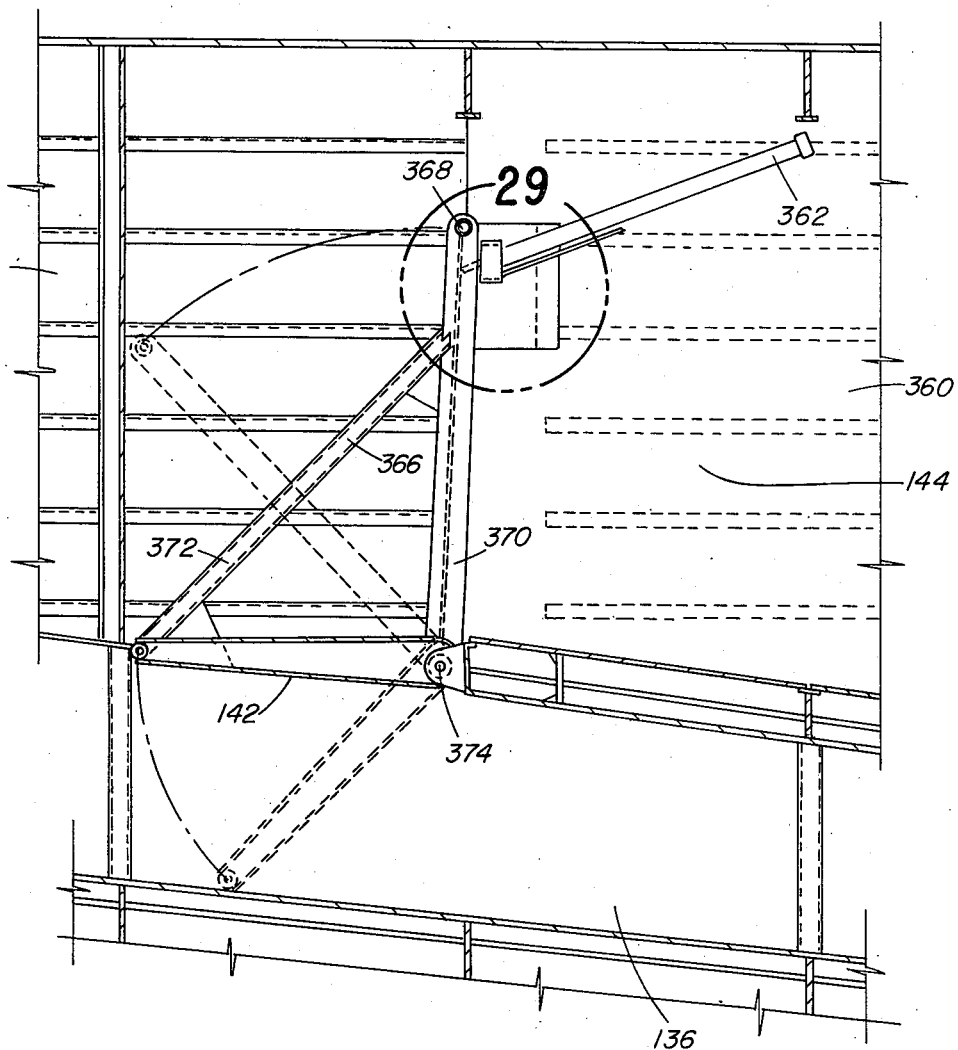
FIG. 27 is a cross-sectional view along section line 27—27 of FIG. 25.

Referring to FIG. 27, the flaps 142 are shown in cross section. The framework 366 is shown along with hydraulic units 362. The flaps 142 are movable into the spill suction tunnel 136 and can be positioned to extend across the tunnel 136 having the forward edge of the flap 142 resting on the bottom of the tunnel 136 (see broken lines) to completely divert any fluid flow therethrough into collection tank 144.

Figure 28:
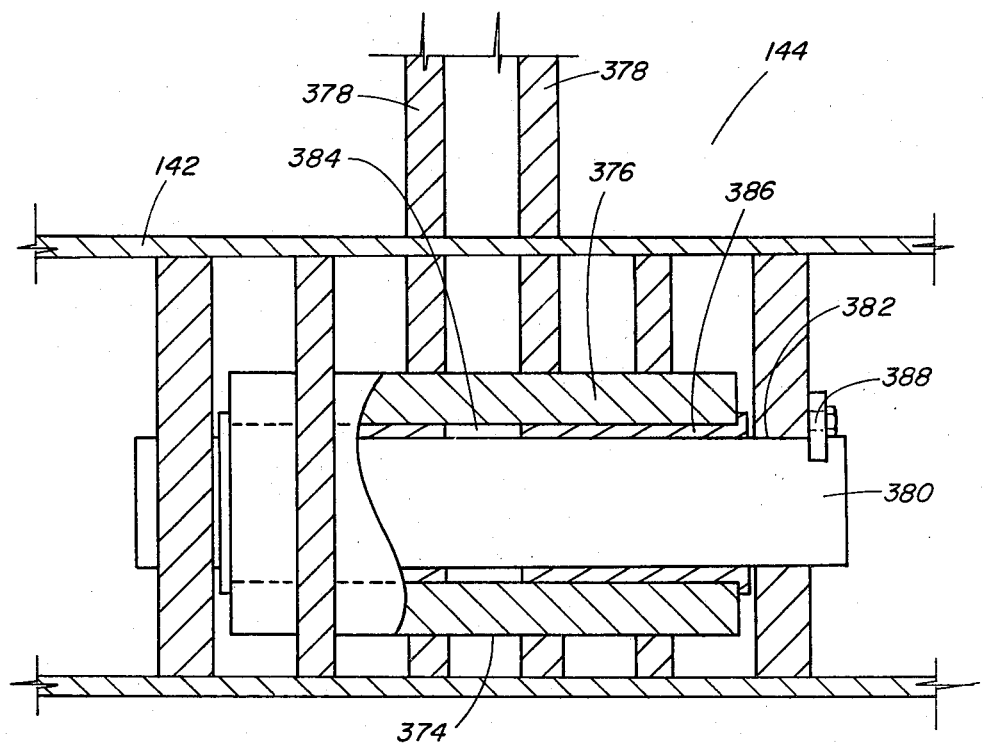
FIG. 28 is an enlarged view of area 28 of FIG. 26.

Referring to FIG. 28, a typical hinge connection 374 is shown for a flap 142. An outer sleeve 376 of a pin type hinge connection 374 is secured to a supporting structure 378 which is, in turn, secured to a bottom portion of collection tank 144, while a pin 380 passes through apertures 382 in a portion of the structure of flap 142 and is rotatably received in the bore 384 of outer sleeve 376. The sleeve 376 may contain a bearing 386 therein, if desired. The pin 380 is secured in position by means of a keeper 388 secured to a portion of the flap 142.

Figure 29:
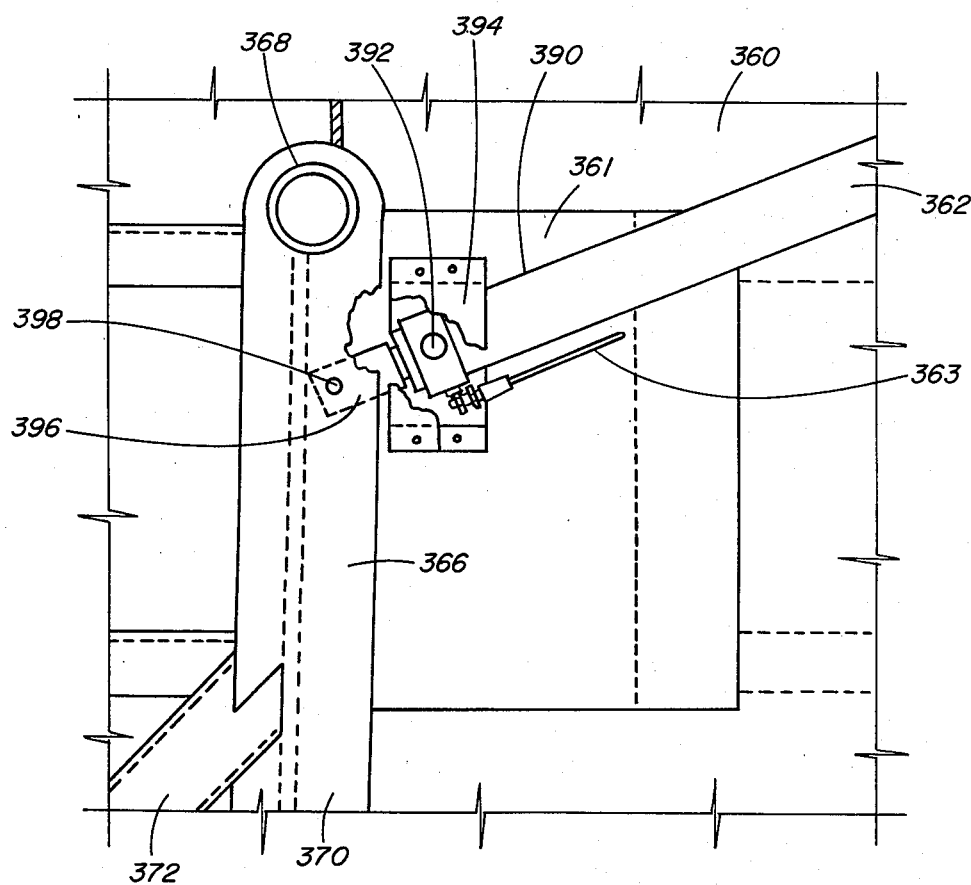
FIG. 29 is an enlarged view of area 29 of FIG. 27.

Referring to FIG. 29, the arrangement between the hydraulic units 362 and the flaps 142 and partitions 360 is shown. The cylinder 390 of the hydraulic unit 362 having hydraulic lines 363 leading thereto is rotatably mounted by pin 392 on either side of the unit 362 to bracket 394 secured to partition 361 and while the piston 396 is rotatably secured by pin 398 to vertical member 370 of framework 366. For mounting the hydraulic unit 362 on a wall of the collection tank 144, a bracket 400 (see FIG. 25) is additionally provided.

OPERATION OF THE OPEN SEA SKIMMER BARGE

The open sea skimmer barge 10 has several contrasting modes of operation in cleaning up spillages depending upon the condition of the seas.

For initial transport of the open sea skimmer barge 10 to the site of spillage, such as from an oil tanker, offshore platform utilized for the exploration or production of hydrocarbons, etc., the barge 10 is towed by the bow 14 with a suitable towing means, such as a tug boat.

Once at the spillage site the oil booms 28 are removed from their storage supports 46 and deployed, having one end of each oil boom 28 secured to the stern 16 of the open sea skimmer barge 10 on either the port or starboard side thereof, and having the other end thereof secured to the towing means.

When the oil booms 28 are deployed, the open sea skimmer barge 10 is ready for skimming operations.

The primary mode or method for skimming operations for the open sea skimmer barge 10 comprises confining the spillage between the deployed oil booms 28 connected to the stern 16 of the barge 10, towing the barge 10 into the spillage thereby directing the spillage being confined between the deployed oil booms 28 into the slot 48 extending across a portion of the stern 16, flowing the spillage and a portion of the underlying water into the spill suction tunnel 136, collecting the spillage flowing along the spill suction tunnel 136 in the collection tank 144, separating the spillage from any water contained within collection tank 144 by means of a secondary separation means 230 contained therein, further separating the spillage from any water contained therein by means for a tertiary separation means 82 and storing the spillage in collection tanks onboard the barge 10 for subsequent removal therefrom.

Since the slicks in the open sea from the spillage of crude oil or refined hydrocarbon product vary considerably in their characteristics depending upon the type of crude oil or refined hydrocarbon product spilled, the wind, size of the spillage and the condition of the sea, the oil booms 28 are utilized to confine the spillage and direct a higher concentration of spillage than that existing in the open sea into the slot 48 extending across a portion of the stern 16 of the open sea skimmer barge 10.

While some shallow-draft barges or scows having a forwardly inclined bow and a horizontal elongate slot or opening means in the bow may be moved through the water by its own power plant or under tow at speeds of approximately five (5) to ten (10) knots or more into spillage thereby causing the spillage to be forced downwardly and flow substantially as a continuous layer along the forwardly inclined bow and be forced into the horizontally elongate slot in the bow intermingled with water due to the positive buoyant differential pressure between the spillage outside the hull of the barge or scow and the pressure in the hold thereof, when operating in the open seas, such a barge or scow cannot generally be efficiently operated unless the seas are calm because the heavy seas will make it difficult to control the bow and its horizontally elongate slot with respect to the spillage on the surface. The heavy seas will be pushed ahead as a bow-head wave with the faster speeds, or else break over the bow of a shallow-draft barge or scow thereby splashing and further dispersing the spillage, and the heavy seas will make it difficult or even dangerous to maintain a relatively high forward velocity for the depression of the spillage below the forwardly inclined bow.

In the open sea skimmer barge 10 of the present invention the barge 10 is either towed at relatively slow velocities, one (1) or two (2) knots typically, or alternately the barge can maintain a stationary position down current directed into the spillage to allow the oil booms 28 to confine and direct the spillage to the slot 48 in the stern 16 of the barge 10. The spillage and a portion of the underlying water is then caused to flow into the spill suction tunnel 136 by the pumping means 162 and/or 270.

When the spillage and a portion of the underlying water is caused to flow into the spill suction tunnel 316, the velocity of the spillage and underlying water is increased from its relatively low velocity to a higher velocity. As the spillage flows into slot 48 and along the spill suction tunnel 136, the spillage will flow along the curvilinear upper wall 137 of the spill suction tunnel 136 as a layer since it is buoyant.

It should be noted that by causing the spillage and a portion of the underlying water to flow along the spill suction tunnel 136 by the action of the pumping means 162 and/or 270, the necessity of a high forward velocity to depress the spillage to cause the same to flow along a curvilinear inclined surface is negated thereby reducing the horsepower requirements for towing, and the wave energy of waves contacting the inlet 48 of the open sea skimmer barge 10 is lessened, thereby producing a quieting effect on the seas in the inlet area, resulting in skimming operations in rough seas without having the seas break over the stern or creating a bow wave effect. Also, the spillage should remain as a more uniform layer rather than being mixed with water by turbulence generated by a shallow-draft barge or scrow passing thereover and causing the wave energy to be dissipated on the inclined bow thereof mixing the spillage and water into an emulsion.

Additionally, the interaction of reflected waves from the oil booms 28, the collection of the spillage before the inlet slot 48 as a more dense area of spillage, the reflection of any waves contacting the curvilinear upper surface 137 of the spill suction tunnel 136, and the effect of pumping the underlying water from beneath the spillage and any waves which may be traveling along the surface of the sea will tend to produce a quieting effect in the area of the sea immediately adjacent the inlet slot 48, thereby allowing the open sea skimmer barge 10 to mantain skimming operations in rough seas.

Furthermore, by pumping a portion of the underlying water from beneath the spillage along with the spillage through the inlet slot 48 into the spill suction tunnel 136, any spillage which has agglomerated and is floating beneath the spillage on the surface of the sea or is in the process of sinking that is floating beneath the spillage on the surface of the sea will be drawn into the spill suction tunnel 136 along with the spillage and may join the layer of spillage flowing along curvilinear upper wall 137 of the spill suction tunnel 136.

At the entry portion of the collection tank 144, the flaps 142 are deflected or opened into the spill suction tunnel 136 to collect the layer of spillage flowing along the curvilinear upper wall 137 of the spill suction tunnel 136, and the layer of spillage flows into the collection tank 144 due to the differential pressure of the spillage and water being higher or greater than the pressure in the collection tank 144. Since it is unavoidable and usually desirable, a small amount of underlying water will flow into the collection tank along with the spillage through the open flaps 142.

When the spillage and a small portion of the underlying water flows into the collection tank 144, the spillage and water in the collection tank 144 produces a relatively calm body of liquid. At this point, since the spillage and water are a relatively calm body of liquid, the spillage can be efficiently separated from the underlying water by secondary separation means 230 contained within the collection tank 144. The spillage is removed from the secondary separation means 230 being collected in sump 150 while water is removed from the collection tank 144 via induction header 152 by means of induction pump means 250 pumping the water overboard.

The water in the spill suction tunnel 136 exists the open sea skimmer barge 10 through outlet 176 thereof so as to produce neither forward nor aft thrust on the barge 10. However, if desired, controlled or stationary deflectors may be installed on the outlet 176 of the spill suction tunnel 136 to produce a forward or aft thrust on the barge 10.

When being collected in the sump 150, any trash contained within the spillage is collected on screens 240 while the spillage passes therethrough being collected in the sump 150. From the sump 150, spillage and any water which remains therein is pumped from the sump by recovered oil pumps 260 into tertiary separation means 82 for the further separation of water from the spillage, if need be. From the tertiary separation means 82, the spillage is stored in the recovered oil tanks for temporary storage until such time as the recovered spillage may be off-loaded.

During skimming operations, the open sea skimmer barge 10 is ballasted through the filling and/or emptying of the various ballast tanks therein to maintain the barge 10 at the desired position with respect to the surface of the sea for the most efficient manner of recovery of spillage. Also, although the open sea skimmer barge 10 can be towed into the spillage, due to wind and currents it may be necessaary to utilize the low thrusters 40 and stern thruster 42 to maintain the barge 10 at the desired postion in the sea to recover the spillage in the most efficient manner.

During skimming operations it may be desirable to spray or inject dispersant chemicals, which are normally contained within tanks 124, into the spill suction tunnel 136 forward of closed flaps 142 to disperse any spillage which does not flow into the collection tank 142 and may utilize the mixing action of the pumping means 162 to thoroughly mix the chemical dispersant and spillage before the water exists the spill suction tunnel 136 through exit 176. Chemical dispersant may also be sprayed at other locations about the open sea skimmer barge 10 to disperse the spillage thereat.

It should be noted that the induction pump means 250 which pumps water from collection tank 144 may be utilized, in addition to pumping means 162, to help maintain a desired level of pressure differential between the layer of spillage flowing along curvilinear wall 137 of the spill suction tunnel 136 and the pressure of the spillage and water within collection tank 144 to further cause the spillage to flow into the collection tank 144 through flaps 142.

During skimming operations, the control of the various pumps, flap positions, secondary and tertiary oil separation means, thrusters, barge ballast tanks, etc. are effected from the skimming control tower 26 on the stern 16 of the open sea skimmer barge 10. In this manner by being able to observe the seas near the inlet 48 of the spill suction tunnel 136, the flow into the collection tank 144 from the spill suction tunnel 136 and the secondary oil separation means 230 through hatches 66 and 70, the barge 10 may be operated in the most efficient manner for the environmental conditions present and the barge conditions. In this manner, the various equipment operating conditions may be controlled for optimal skimming operations.

When sufficient spillage has been recovered, or at any desired time, the spillage in the recovered oil tanks may be transferred to another ship for transshipment for disposal or sale.

A secondary mode or method for skimming operations for the open sea skimmer barge 10 in calmer sea conditions comprises confining the spillage between the deployed oil booms 28 connected to the stern 16 of the barge 10, towing the barge 10 into the spillage thereby directing the spillage being confined between the deployed oil booms 28 into the slot 48 extending across a portion of the stern 16, flowing the spillage and water through the spill suction tunnel 136, extending the flaps 142 completely across the spill suction tunnel 136 thereby blocking the fluid flow therethrough and causing the same to flow entirely into the collection tank 144, separating the spillage from any water contained within the collection tank 144 by means of a secondary separation means 230 contained therein, further separating the spillage from any water contained therein by means of tertiary separation means 82 and storing the spillage in collection tanks onboard the barge 10 for subsequent removal therefrom.

When utilizing the open sea skimmer barge 10 of the present invention in this manner, the barge 10 is ballasted to cause the spillage to flow through slot 48 into spill suction tunnel 136 and therealong with controlled or minimal contact with curvilinear upper wall 137 of the tunnel 136 and is caused to flow into the collection tank 144 due to the velocity of the barge 10 through the sea and any action of inductance pumps 260 pumping water from the collection tank 144.

Once in collection tank 144, the spillage is separated from any water contained therein by secondary separation means 230 which deposits the same in sump 150. From the sump 150, spillage and any water which remains therein is pumped from the sump by recovered oil pumps 260 into tertiary separation means 82 for the further separation of water therefrom, if required. From the tertiary separation means 82, the spillage is stored in the recovered oil tanks until it may be offloaded.

Yet another mode or method of skimming operation for the open sea skimmer barge 10 may comprise confining the spillage between deployed oil booms 28 connected to the stern 16 of the barge 10, towing the barge into the spillage at a rate of velocity sufficiently high to direct the spillage being confined between the deployed oil booms 28 into the slot 48 extending across a portion of the stern 16 and causing the spillage to be forced downwardly along curvilinear wall 137 of the spill suction tunnel 137, flowing the spillage and water through the spill suction tunnel 136, collecting the spillage flowing along the spill suction tunnel 136 in the collection tank 144, separating the spillage from any water contained within collection tank 144 by means of secondary separation means 230 contained therein, further separating the spillage from any water contained therein by means of a tertiary separation means 82 and storing the spillage in collection tanks onboard the barge 10 for subsequent removal therefrom.

In this manner, the open sea skimmer barge 10 is ballasted to cause the spillage to flow through slot 48 into and through spill suction tunnel 136 and contact the curvilinear upper wall 137 to thereby force the spillage downwardly therealong without utilizing the pumping action of the pump means 162 in the tunnel 136. However, utilizing the pumping action of the induction pumps 250 causes the spillage and a small amount of water to flow into collection tank 144 through the flaps 142 being partially extended into the spill suction tunnel 136.

In unusual sea conditions where the surface of the sea is running very rapidly, another mode or method of skimming operation for the open sea skimmer barge 10 may comprise any one of the above modes or methods of operation for the barge 10, but rather than towing the barge into the spillage, the barge 10 is towed by the bow 14 away from the spillage letting the surface of the sea, which is moving rapidly towards the slot 48 in the stern 16 of the barge, cause the spillage to be brought to the barge 10 to be collected by the deployed oil booms 28 before entering slot 48 and spill suction tunnel 136.

It should be understood that the above methods are merely illustrative of a few of many different modes or method of skimming operations by the open sea skimmer barge 10, and the operation of the barge 10 is not to be limited solely to these methods. Depending upon the environmental conditions in which the open sea skimmer barge 10 is to be operated, it is envisioned that the barge 10 will be operated in the most efficient manner to recover the spillage and the many possible modes or methods of operation will be selected at that time for the barge 10.

It should also be understood that although the open sea skimmer barge 10 employs three distinct separation techniques for separating the spillage and water, the primary or tertiary separation technique may either, or both, be eliminated, if so desired, during operation of the barge 10, as well as the barge 10 being operated without the deployment of the oil booms 28.

Once spillage skimming operations have been completed, the oil booms 28 are retrieved through the use of winches 62, 74 and 120 on the main deck 32 of the open sea skimmer barge 10. As each oil boom 28 is retrieved, the wheels 504 located on the boom floats 500 engage track ramp 58 and track 56 which runs along a portion of track ramp 58 of aft ramps 44 and boom supports 46.

During retrieval of each oil boom 28, the boom 28 is cleaned utilizing cleaners 64 located on the main deck 32. In this manner, any spillage adhering to an oil boom 28 may be removed to prevent contaimination of the main deck 32, any equipment, or any personnel.

It should be understood that the equipment described hereinbefore necessary for the operation, control, etc. of the open sea skimmer barge 10 has only been described in general and any suitable equipment functioning in the same manner may be utilized for such equipment. For instance, the secondary oil separation means 230 has been described as a filter belt module. Any suitable type of secondary oil separation means 230 may be utilized in the collection tank 144 to separate spillage from any water contained within collection tank 144. Similarly, although each oil boom 28 has been described as having wheels 504 connected thereto, rollers could be provided on aft ramps 44 and the boom supports 46 and the wheels deleted. Also, skid runners could replace wheels on the boom floats 500, if desired.

OTHER USES OF THE BARGE

The open sea skimmer barge 10 of the present invention can be utilized for purposes other than the recovery of spillage on the surface of the water.

For example, the open sea skimmer barge 10 may be utilized as a dredge in shallow water areas. In shallow water areas, since the water being pumped from the spill suction tunnel 136 exits the tunnel 136 downwardly at approximately a ninety-degree (90°) angle with respect to a plane passing through the bottom of the open sea skimmer barge 10, if the bottom of the barge 10 is adjacent the bottom of a shallow water area, the water exiting the tunnel 136 will tend to erode the bottom of the shallow water area beneath the barge 10 thereby locally increasing the water depth of the area. The open sea skimmer barge 10 may be ballasted to operate in various depths of water in shallow water areas and the rate of pumping of water through spill suction tunnel 136 can be varied to utilize the erosive action of the water exiting the spill suction tunnel 136 to control the amount and rate of erosion of the bottom of the shallow water area.

Another possible use of the open sea skimmer barge 10 is as a maintenance or fire extinguishing barge. For use in these types of barge operations, the skimming capability of the open sea skimmer barge 10 would not be required, but the barge should be positioned near a platform or drilling rig for assistance.

Those skilled in the art may recognize additions, deletions, substitutions and modifications which may be made with respect to the disclosed open sea skimmer barge and its methods of operation, but which would lie within the purview of the invention as defined by the appended claims.

Having thus described our invention, we claim:

1. A method of skimming oil and the like from the surface of a body of water utilizing a vessel having a hull having a bow, a stern having an elongate substantially horizontal slot extending across a portion thereof, side walls, a bottom, a deck, a spill suction tunnel, tunnel pump means, a collection tank, collection tank flap means located in the bottom of the collection tank and extensible into the spill suction tunnel, collection tank pump means, secondary oil recovery means, tertiary oil recovery means and oil boom means thereon, said method comprising the steps of:

deploying the oil boom means on said vessel in said body of water;

releasably securing oil boom means to the stern of said vessel;

towing said vessel by the stern thereof into said oil and the like by the oil boom means;

confining said oil and the like between the oil boom means thereby collecting said oil and the like adjacent the elongate substantially horizontal slot in the stern of said vessel;

flowing said oil and the like and a portion of the water of said body of water underlying said oil and the like into the spill suction tunnel;

flowing said oil and the like and an amount of water from said body of water which was flowed into the suction tunnel into the collection tank;

separating said oil and the like from the water in the collection tank utilizing the secondary oil recovery means; and separating said oil and the like from substantially any remaining water contained therein utilizing the tertiary oil recovery means after the separation of said oil and the like from the water in the collection tank utilizing the secondary oil recovery means.

2. The method of claim 1 further comprising the step of:

towing said vessel by the bow thereof to said oil and the like on the surface of said body of water.

3. The method of claim 1 further comprising the step of:

adjusting the position of the oil boom means with respect to said vessel when releasably securing the oil boom means to the stern of said vessel.

4. The method of claim 1 further wherein the tunnel pump means are utilized for flowing said oil and the like and a portion of the water of said body of water underlying said oil and the like into the spill suction tunnel.

5. The method of claim 1 further comprising the step of:

extending the collection tank flap means into the spill suction tunnel to cause the flowing into the collection tank of said oil and the like and water from said body of water which was flowed into the spill suction tunnel.

6. The method of claim 1 further comprising the step of:

controlling the amount of said oil and the like and water from said body of water in the collection tank.

7. The method of claim 1 further comprising the step of:

flowing water from said body of water in the collection tank from said vessel into said body of water.

8. The method of claim 7 wherein the collection tank pump means are utilized for flowing the water from said body of water in the collection tank from said vessel into said body of water.

9. The method of claim 1 further comprising the step of:

extending the collection tank flap means across the spill suction tunnel to cause the flowing into the collection tank of substantially all said oil and the like and water from said body of water which was flowed into the spill suction tunnel.

10. The method of claim 9 further comprising the step of:

controlling the amount of said oil and the like and water from said body of water in the collection tank.

11. The method of claim 10 wherein the collection tank pump means are utilized to pump the water from said body of water from the collection tank to said body of water thereby controlling the amount of said oil and the like and water from said body of water in the collection tank.

12. The method of claim 1 further comprising the step of:

discharging the remaining amount of water in the spill suction tunnel means from said vessel.

13. The method of claim 12 further comprising the step of:

spraying dispersant chemicals into the spill suction tunnel after the flowing into the collection tank of said oil and the like and an amount of water from said body of water which was flowed into the spill suction tunnel.

14. The method of claim 1 wherein the initial portion of the spill suction tunnel is curvilinear.

15. The method of claim 1 further comprising the step of:
ballasting said vessel during said skimming oil and the like from the surface of a body of water.

16. A method of skimming oil and the like from the surface of a body of water utilizing a vessel having a bow, a stern having an elongate substantially horizontal slot extending across a portion thereof, side walls, a bottom a deck, tunnel pump means, a collection tank, collection tank flap means located in the bottom of the collection tank and extensible into the spill suction tunnel, collection tank pump means, secondary oil recovery means, tertiary oil recovery means, and oil boom means thereon, said method comprising the steps of:
towing said vessel by the bow thereof to said oil and the like of the surface of said body of water;
deploying the oil boom means on said vessel in said body of water;
releasably securing the oil boom means to the stern of said vessel;
towing said vessel by the stern thereof into said oil and the like by the oil boom means;
confining said oil and the like between the oil boom means thereby collecting said oil and the like adjacent the elongate substantially horizontal slot in the stern of said vessel;
flowing said oil and the like and a portion of the water of said body of water underlying said oil and the like into the spill suction tunnel utilizing the tunnel pump means;
extending the collection tank flap means into the spill suction tunnel;
flowing said oil and the like and an amount of water from said body of wateer which was flowed into the spill suction tunnel through the collection tank flap means into the collection tank;
separating said oil and the like from a substantial portion of the water which was flowed into the collection tank therewith utilizing the secondary oil recovery means;
flowing water from said body of water in the collection tank from said vessel into said body of water utilizing the collection tank pump means; and
separating said oil and the like from substantially any remaining water contained therein utilizing the tertiary oil recovery means after the separation of said oil and the like from the water in the collection tank utilizing the secondary oil recovery means.

17. The method of claim 16 further comprising the step of:
controlling the amount of said oil and the like and water from said body of water in the collection tank.

18. The method of claim 17 wherein the collection tank flap means are utilized for controlling of the amount of said oil and the like and water from said body of water in the collection tank.

19. The method of claim 17 wherein the collection tank flap means and the collection tank pump means are utilized for controlling of the amount of said oil and the like and water from said body of water in the collection tank.

20. The method of claim 17 wherein the collection tank flap means, the collection tank pump means and the secondary oil recovery means are utilized for controlling of the amount of said oil and the like and water from said body of water in the collection tank.

21. The method of claim 16 further comprising the step of:
discharging the remaining amount of water in the spill suction tunnel means from said vessel.

22. The method of claim 21 further comprising the step of:
spraying dispersant chemicals into the spill suction tunnel after flowing said oil and the like and an amount of water from said body of water which was flowed into the spill tunnel into the collection tank.

23. The method of claim 16 further comprising the step of:
releasing the oil boom means from the stern of said vessel;
retrieving the oil boom means from said body of water;
cleaning the oil boom means while retrieving the same; and
storing the oil boom means on said vessel.

24. A method of skimming oil and the like from the surface of a body of water utilizing a vessel having a bow, a stern having an elongate substantially horizontal slot extending across a portion thereof, side walls, a bottom, a deck, tunnel pump means, a collection tank, collection tank flap means located in the bottom of the collection tank and extensible into the spill suction tunnel, collection tank pump means, secondary oil recovery means, tertiary oil recovery means, and oil boom means thereon, said method comprising the steps of:
towing the vessel by the bow thereof to said oil and the like of the surface of said body of water;
deploying the oil boom means on said vessel in said body of water;
releasably securing the oil boom means to the stern of said vessel;
towing said vessel by the stern thereof into said oil and the like by the oil boom means;
confining said oil and the like between the oil boom means thereby collecting said oil and the like adjacent the elongate substantially horizontal slot in the stern of said vessel;
flowing said oil and the like and a portion of the water of said body of water underlying said oil and the like into the spill suction tunnel utilizing the tunnel pump means;
extending the collection tank flap means into the spill suction tunnel;
flowing said oil and the like and an amount of water from said body of water which was flowed into the spill suction tunnel through the collection tank flap means into the collection tank;
separating said oil and the like from a substantial portion of the water which was flowed into the collection tank therewith utilizing the secondary oil recovery means;
flowing water from said body of water in the collection tank from said vessel into said body of water utilizing the collection tank pump means;
discharging the remaining amount of water in the spill suction tunnel means from said vessel; and separating said oil and the like from substantially any remaining water contained therein utilizing the tertiary oil recovery means after the separation of said oil and the like from the water in the collection tank utilizing the secondary oil recovery means.

25. The method of claim 24 wherein the secondary oil separation means comprises filter belt module means.

26. The method of claim 25 wherein the tertiary oil separation means comprises gravity type oil separation means.

* * * * *

UNITED STATES PATENT AND TRADEMARK OFFICE
CERTIFICATE OF CORRECTION

PATENT NO. : 4,399,040

DATED : August 16, 1983

INVENTOR(S) : William M. Ayers et al.

It is certified that error appears in the above-identified patent and that said Letters Patent is hereby corrected as shown below:

In column 3, line 8, delete the word [along] and insert --alone--.
In column 7, line 39, delete the word [area] and insert --sea--.
In column 9, line 22, delete the word [now] and insert --not--.
In column 13, line 56, delete the word [mantain] and insert --maintain--.
In column 14, line 50, delete the word [postion] and insert --position--.
In column 15, line 48, delete the word [inductance] and insert --induction--.

In column 20, line 17, following the word "spill" insert the word --suction--.

Signed and Sealed this

Sixth Day of March 1984

[SEAL]

Attest:

Attesting Officer

GERALD J. MOSSINGHOFF

Commissioner of Patents and Trademarks